US009664376B2

(12) United States Patent
Abe et al.

(10) Patent No.: US 9,664,376 B2
(45) Date of Patent: May 30, 2017

(54) PROJECTION-TYPE IMAGE DISPLAY APPARATUS

(71) Applicant: Panasonic Intellectual Property Management Co., Ltd., Osaka (JP)

(72) Inventors: Takaaki Abe, Osaka (JP); Masutaka Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/876,361

(22) Filed: Oct. 6, 2015

(65) Prior Publication Data
US 2016/0025327 A1 Jan. 28, 2016

Related U.S. Application Data

(63) Continuation of application No. PCT/JP2014/002136, filed on Apr. 15, 2014.

(30) Foreign Application Priority Data

Apr. 18, 2013 (JP) .................................. 2013-087161
Jul. 4, 2013 (JP) .................................. 2013-140453

(51) Int. Cl.
*F21V 33/00* (2006.01)
*H04N 13/04* (2006.01)
(Continued)

(52) U.S. Cl.
CPC .......... *F21V 33/0052* (2013.01); *G03B 21/14* (2013.01); *G03B 21/204* (2013.01);
(Continued)

(58) Field of Classification Search
CPC .. G03B 21/26; G03B 21/142; H04N 13/0454; H04N 13/0456
See application file for complete search history.

(56) References Cited

U.S. PATENT DOCUMENTS 5,782,548 A * 7/1998 Miyashita ............... G03B 21/26
353/42
2006/0092390 A1* 5/2006 Akiyama ................. H04N 9/315
353/102
(Continued)

FOREIGN PATENT DOCUMENTS

JP S59-079837 U 5/1984
JP H10-039269 A 2/1998
(Continued)

OTHER PUBLICATIONS

International Search Report for corresponding International Application No. PCT/JP2014/002136 mailed Jul. 22, 2014.
(Continued)

*Primary Examiner* — Sultan Chowdhury
(74) *Attorney, Agent, or Firm* — Renner, Otto, Boisselle & Sklar, LLP

(57) ABSTRACT

A projection-type image display apparatus includes a light source unit, an image generating unit that generates image light according to an input video signal, a light-guide optical system that guides the light from the light source unit to the image generating unit, a projection optical system that projects the image light generated by the image generating unit, and a controller. The controller has a display mode in which the image light is projected and an illumination mode in which the light from the light source unit is emitted as illumination light. The controller controls the optical system to focus illumination light from the projection optical system on a projection surface, in the display mode, and to focus illumination light from the projection optical system at a position different from the projection screen, in the illumination mode.

1 Claim, 20 Drawing Sheets

(51) Int. Cl.
G03B 21/14 (2006.01)
G03B 21/20 (2006.01)
G03B 29/00 (2006.01)
H04N 9/31 (2006.01)

(52) U.S. Cl.
CPC ............... *G03B 29/00* (2013.01); *H04N 9/31* (2013.01); *H04N 9/315* (2013.01); *H04N 9/3185* (2013.01); *H04N 13/0454* (2013.01)

(56) References Cited

U.S. PATENT DOCUMENTS

| | | | |
|---|---|---|---|
| 2007/0076174 A1 | 4/2007 | Gerets et al. | |
| 2008/0309811 A1* | 12/2008 | Fujinawa | G02F 1/1347 348/333.01 |
| 2010/0045784 A1* | 2/2010 | Okazaki | H04N 13/0029 348/55 |
| 2010/0220293 A1 | 9/2010 | Mizushima et al. | |
| 2010/0289664 A1 | 11/2010 | Mizushima et al. | |
| 2012/0092337 A1* | 4/2012 | Tsao | G02B 27/2214 345/419 |
| 2014/0022463 A1 | 1/2014 | Kinebuchi et al. | |
| 2014/0049698 A1* | 2/2014 | Hirata | G03B 21/006 349/9 |

FOREIGN PATENT DOCUMENTS

| | | |
|---|---|---|
| JP | 2002-116498 A | 4/2002 |
| JP | 2004-013043 A | 1/2004 |
| JP | 2007-094417 A | 4/2007 |
| JP | 2008-041595 A | 2/2008 |
| JP | 2008-185757 A | 8/2008 |
| JP | 2009-076397 A | 4/2009 |
| JP | 2009-298201 A | 12/2009 |
| JP | 2011-170279 A | 9/2011 |
| JP | 2014-021428 A | 2/2014 |
| WO | WO 2009/034694 A1 | 3/2009 |
| WO | WO 2010/044204 A1 | 4/2010 |

OTHER PUBLICATIONS

International Preliminary Report on Patentability for corresponding International Application No. PCT/JP2014/002136 mailed Oct. 20, 2015.

* cited by examiner

DISPLAY MODE

ILLUMINATION MODE

Fig. 16A

DISPLAY MODE

| 0 | 0 | 0 |
|---|---|---|
| 0 | 1 | 0 |
| 0 | 0 | 0 |

Fig. 16B

ILLUMINATION MODE

| 1/9 | 1/9 | 1/9 |
|-----|-----|-----|
| 1/9 | 1/9 | 1/9 |
| 1/9 | 1/9 | 1/9 |

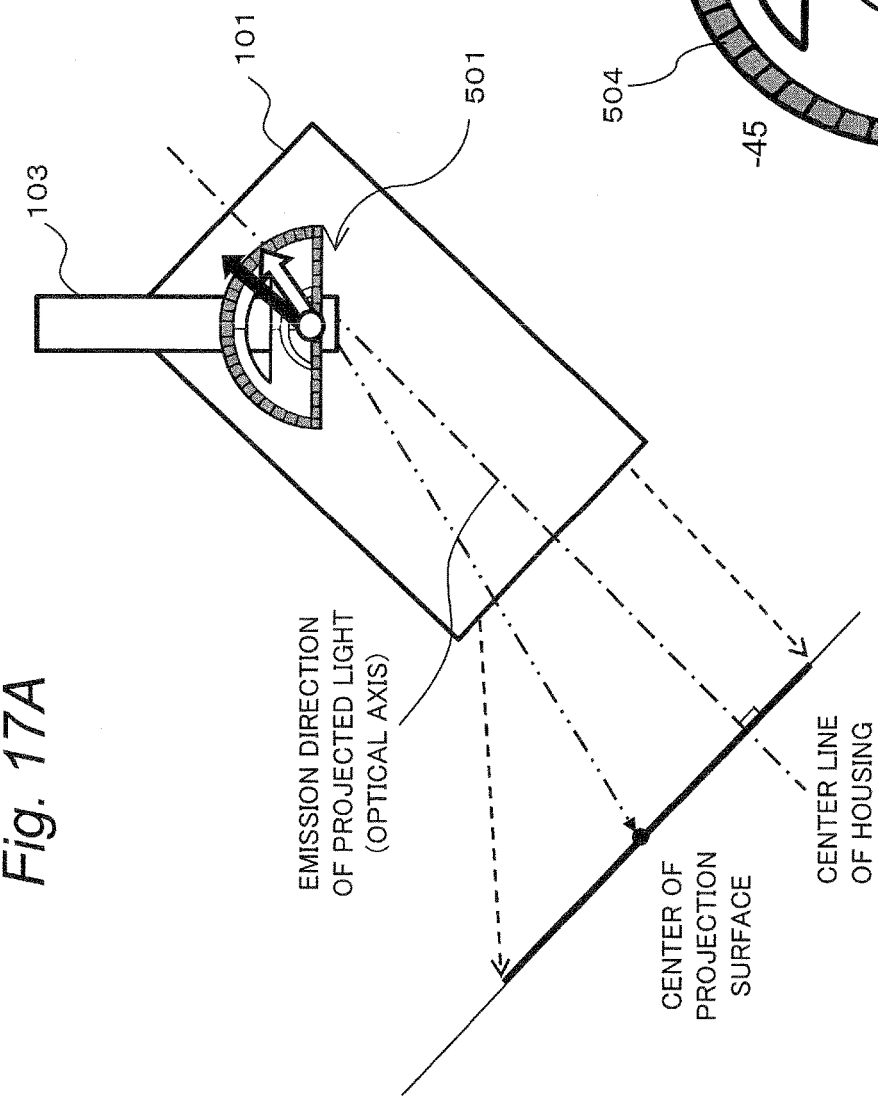
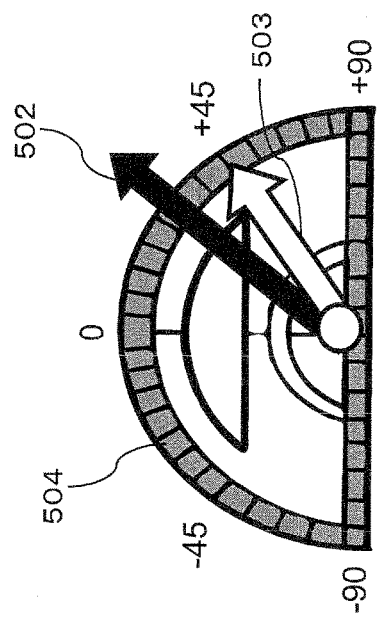
Fig. 17A
Fig. 17B

PROJECTION-TYPE IMAGE DISPLAY APPARATUS

CROSS-REFERENCE TO RELATED APPLICATIONS

This is a continuation application of International Application No. PCT/JP2014/002136 with an international filing date of Apr. 15, 2014, which claims priority of Japanese Patent Application Nos. 2013-087161 filed on Apr. 18, 2013 and 2013-140453 filed on Jul. 4, 2013, the contents of which are incorporated herein by reference.

BACKGROUND

1. Technical Field

The present disclosure relates to a projection-type image display apparatus having an illumination function and an image display function.

2. Related Art

Today a projector is widely prevalent as a projection-type image display apparatus that projects large images, or the like.

The projector modulates light emitted from a light source according to a video signal with a spatial light modulator such as a digital micromirror device (DMD) or a liquid-crystal display element, to project the modulated light on the screen.

Various projectors have also been developed that are disposed on a ceiling to project images on a floor or a wall surface. The projectors disposed for use on the ceiling entail various problems to be studied, such as necessity for dedicated holders or wiring works, storage method, device size reduction, easiness in work, ease of use, and a sense of beauty.

In view of these problems, Japanese Laid-Open Patent Publication No. 2008-185757 for example proposes a projection-type image display apparatus having a connector attachable to illumination wiring fixtures and having an illumination device disposed on a housing surface corresponding to the floor.

A projection-type image display apparatus has also been developed that has both an illumination function to emit illumination light such as spot light and an image display function to project images (e.g., Japanese Laid-Open Patent Publication No. 2007-094417).

SUMMARY

Unlike image light to display moving pictures or still pictures, it is generally preferred that illumination light be uniform without spatial unevenness.

The present disclosure provides a projection-type image display apparatus having both the illumination function and the image display function and being capable of emitting high-quality illumination light.

A projection-type image display apparatus includes a light source unit, an image generating unit that generates image light according to an input video signal, a light-guide optical system that guides the light from the light source unit to the image generating unit, a projection optical system that projects the image light generated by the image generating unit, and a controller that controls the image generating unit, the light-guide optical system, and the projection optical system. The controller has a display mode in which the image light is projected and an illumination mode in which the light from the light source unit is emitted as illumination light. The controller controls the projection optical system to focus illumination light from the projection optical system on a projection surface, in the display mode, and to focus illumination light from the projection optical system at a position different from the projection screen, in the illumination mode.

According to the present disclosure, focusing is performed at a position offset from a projection surface in the illumination mode. Thus, light capable of achieving high spatial uniformity can be irradiated, and high-quality illumination light can be emitted.

BRIEF DESCRIPTION OF DRAWINGS

FIGS. 16A and 16B are views exemplifying smoothing filter coefficients in the display modes.

FIGS. 17A and 17B are views explaining an angle adjusting guide of the projection-type image display apparatus.

DETAILED DESCRIPTION OF EMBODIMENTS

Embodiments will now be described in detail with proper reference to the drawings. Note however that excessively detailed description may be omitted. For example, detailed description of already well-known matters and repeated description of substantially the same configuration may be omitted. This is for the purpose of preventing the following description from becoming unnecessarily redundant, to facilitate the understanding of those skilled in the art.

The applicant provides the accompanying drawings and the following description in order for those skilled in the art to fully understand the present disclosure and it is not intended to limit the subject matters defined in the claims by them.

First Embodiment

1. Outline of Projection-Type Image Display Apparatus

Figure 1:
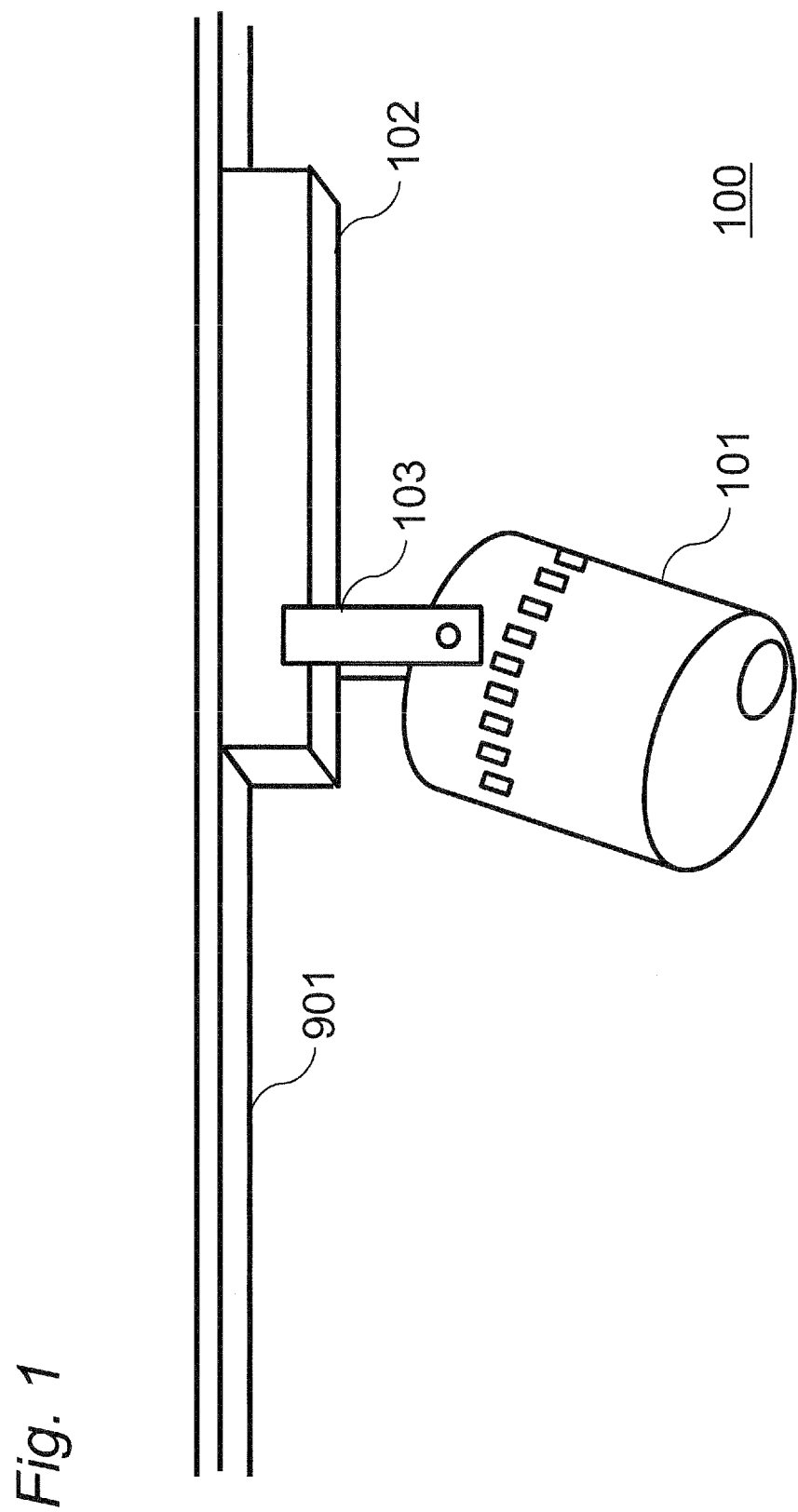
FIG. 1 is a perspective view of a projection-type image display apparatus according to the present disclosure.

A projection-type image display apparatus will be described below with reference to the drawings. FIG. 1 is a perspective view of the projection-type image display apparatus. A projection-type image display apparatus 100 includes a first housing 101 that houses a light source unit, etc., a second housing 102 connecting to a wiring duct 901 disposed on a ceiling, and a support portion 103 coupling the first housing 101 and the second housing 102 with each other.

Figure 2:
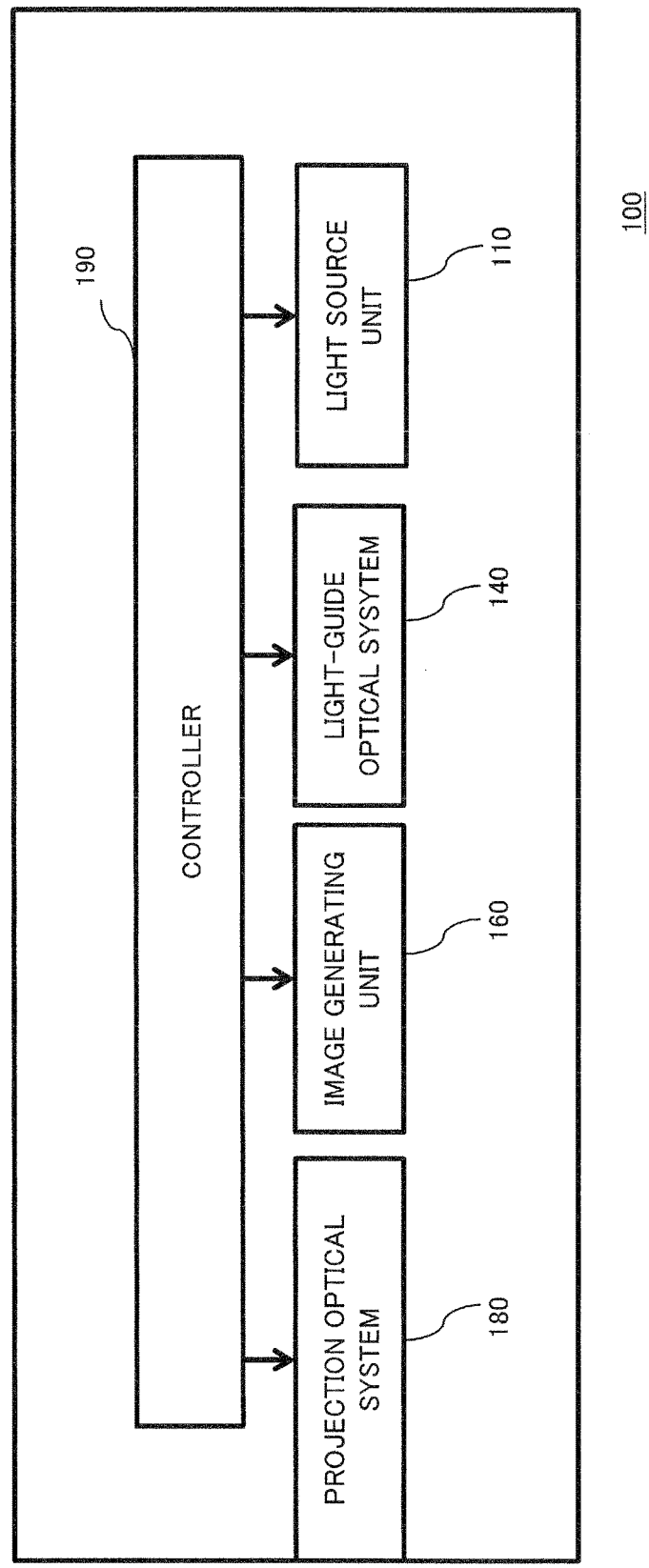
FIG. 2 is a block diagram showing the configuration of the projection-type image display apparatus.

FIG. 2 is a block diagram showing the internal configuration of the projection-type image display apparatus 100. The projection-type image display apparatus 100 is provided with a light source unit 110 that emits light, an image generating unit 160 that generates image light according to a video input signal, a light-guide optical system 140 that guides light from the light source unit 110 to the image generating unit 160, a projection optical system 180 that projects generated image light onto a screen (not shown), and a controller 190 that controls the light source unit 110, the image generating unit 160, and the like.

The light source unit 110 of the present disclosure has laser diodes to cause a phosphor substance to emit light with light from the laser diode as excitation light. The light-guide optical system 140 includes optical members such as various lenses, mirrors, or rods to guide light emitted from the light source unit 110 to the image generating unit 160. The image generating unit 160 uses elements such as a digital micro-mirror device (hereinafter, referred to as "DMD") and a liquid-crystal panel to spatially modulate light in response to a video signal. The projection optical system 180 includes optical members such as lenses and mirrors to project the spatially modulated light onto the screen (projected surface).

2. Optical Configuration of Projection-Type Image Display Apparatus

Figure 3:
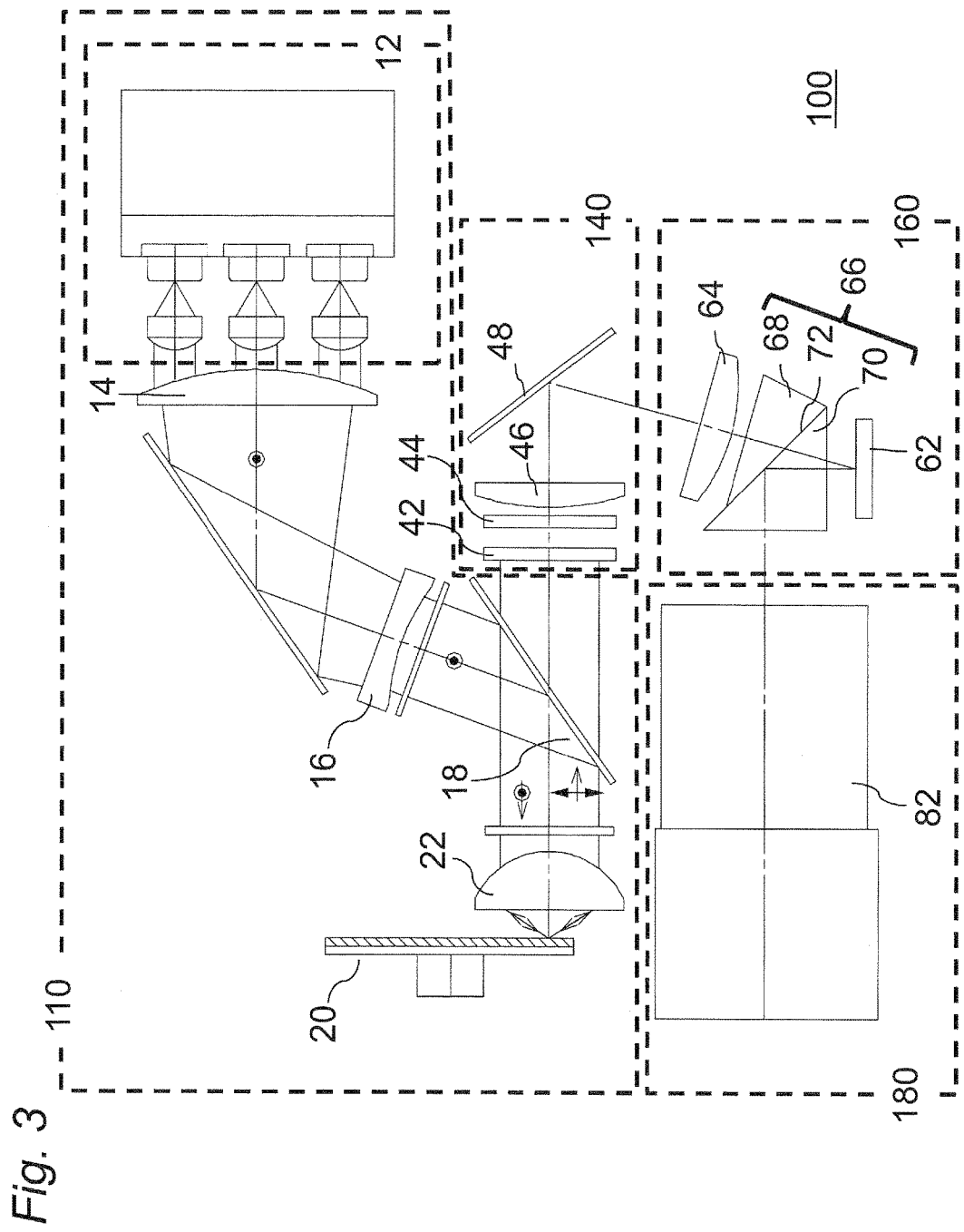
FIG. 3 is a schematic view explaining the optical configuration of the projection-type image display apparatus.

FIG. 3 is a schematic view explaining the optical configuration of the projection-type image display apparatus 100.

The projection-type image display apparatus 100 has the light source unit 110, the image generating unit 160 that generates image light according to a video input signal, the light guide optical system 140 that guides light from the light source unit 110 to the image generating unit 160, and the projection optical system 180 that projects the generated image light onto a screen (not shown).

Figure 4:
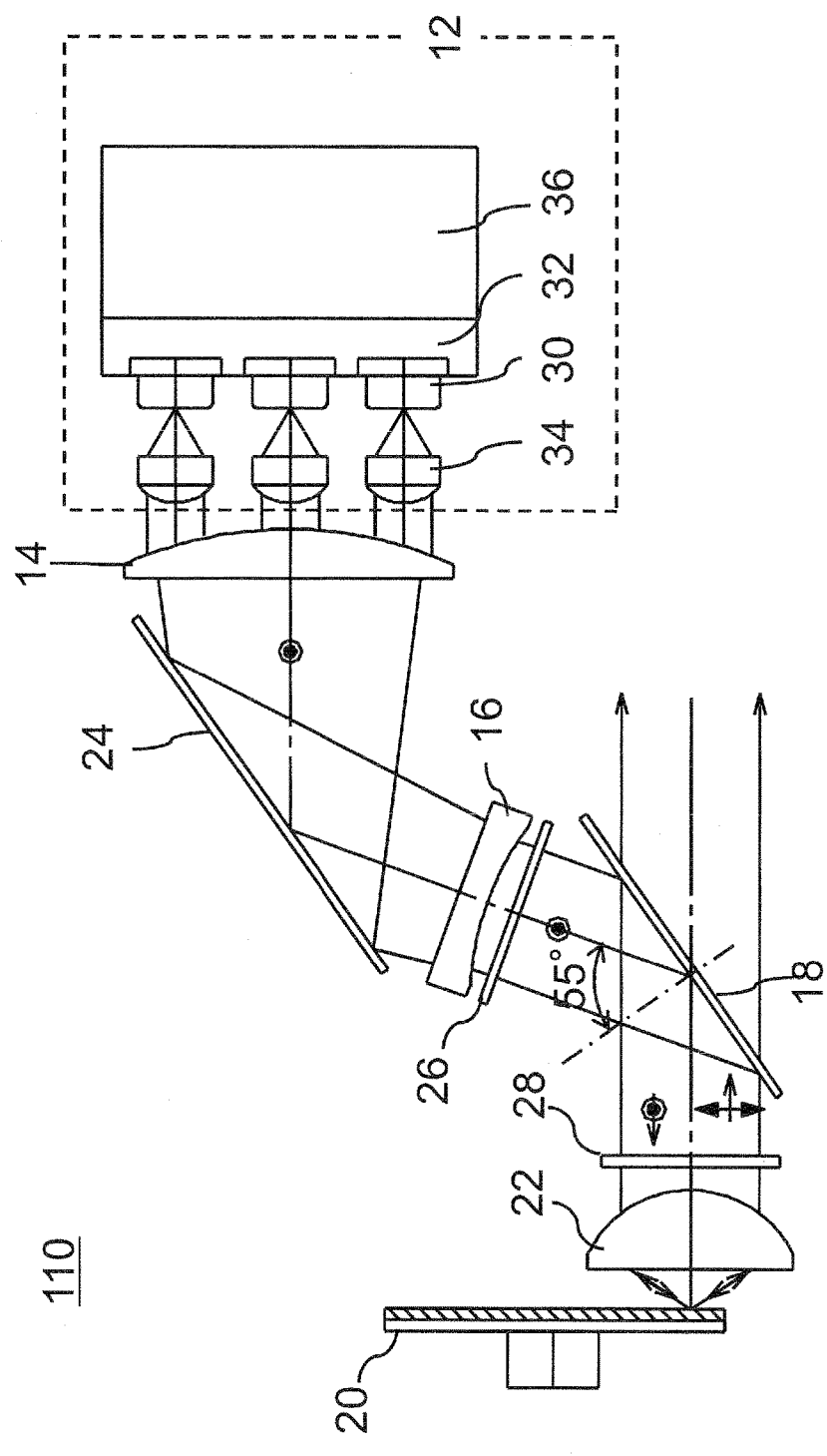
FIG. 4 is a schematic view explaining the optical configuration of a light source unit.

FIG. 4 is a view showing the detailed configuration of the light source unit 110. As shown in FIG. 4, the light source unit 110 is provided with a solid state light source unit 12, a convex lens 14 that condenses parallel luminous flux from the solid state light source unit 12, a concave lens 16 that again converts light from the lens 14 into parallel light, and a mirror 24 interposed between the convex lens 14 and the concave lens 16. The light source unit 110 further includes a dichroic mirror 18 that changes the optical path of the parallel light from the lens 16, a phosphor wheel 20, and a lens 22 that condenses the parallel light onto the phosphor wheel 20. The dichroic mirror 18 is arranged with a tilt of 55° with respect to the optical axis of parallel light from the lens 16. The reason for such an arrangement will be described later. The light source unit 110 further has a diffuser 26 disposed posterior to the concave lens 16 to reduce the coherence while keeping the polarization property and a λ/4 plate 28 interposed between the dichroic mirror 18 and the lens 22.

The solid state light source unit 12 includes twelve laser diodes 30 and condenser lenses 34 arranged facing the laser diodes 30. The laser diodes 30 are arranged in a 3×4 matrix at regular intervals on a radiator plate 32. A heat sink 36 serves to cool the solid state light source unit 12. The laser diodes 30 emit linearly polarized blue color light with a wavelength width of 440 nm to 455 nm. The laser diodes 30 are arranged such that the polarization direction of the emitted light is s-polarization with respect to the plane of incidence of the dichroic mirror 18.

The light emitted from the solid state light source unit 12 is reduced in diameter by the convex lens 14 and the concave lens 16, entering the diffuser 26. The mirror 24 changes the optical path to cause the diameter-reduced luminous light to enter the posterior-located dichroic mirror 18 at an incident angle of 55°. The light leaving the diffuser 26 enters the dichroic mirror 18.

Figure 5:
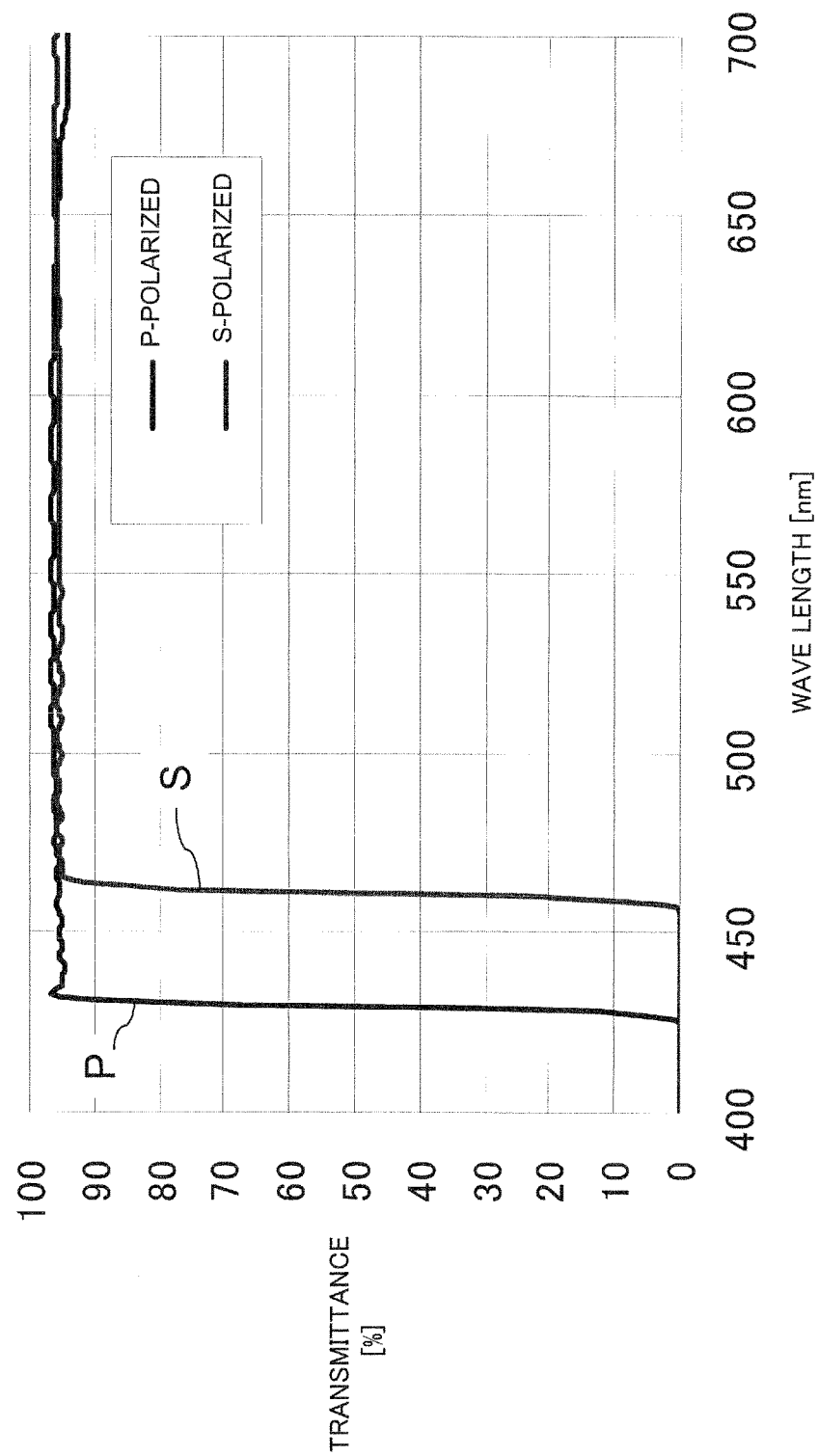
FIG. 5 is a graph showing the spectral characteristics of a dichroic mirror.

FIG. 5 shows the spectral characteristics (55° incidence) of the dichroic mirror 18 according to the present disclosure. FIG. 5 shows the wavelength versus transmittance as the spectral characteristics. A line P represents characteristics for p-polarized light, while a line S represents characteristics for s-polarized light. According to the spectral characteristics of the dichroic mirror 18, about 94% or more p-polarized light at wavelengths of 440 nm to 445 nm transmits through the dichroic mirror 18. Similarly, 440 nm to 445 nm wavelength s-polarized light reflects at a high reflectance of 98% or more. Green color light to red color lights with wavelengths of 490 nm to 700 nm transmit at a high transmittance of 95% or more in both the p-polarized light and the s-polarized light. The width of wavelength separation achieving 50% of transmittance for p-polarized light and s-polarized light is about 30 nm. This width of wavelength separation is longer than the case (about 20 nm) of 45° in incident angle, leading to a higher light separation ability for p-polarized light and s-polarized light. Thus light utilization efficiency can be improved. In the present embodiment, by arranging the dichroic mirror 18 at an incident angle of 55°, the improved light utilization efficiency and the size reduction of the light source unit 110, particularly, vertical distance in FIG. 4, can be achieved. That is, by arranging the dichroic mirror 18 with an angle of more than 45° (55° in this case) relative to the optical path, instead of ordinary 45° arrangement, the size of the light source unit 110 can be reduced. The disposition angle of the dichroic mirror 18 may be more than 45°, particularly, may be 50° or more for size reduction. On the other hand, to separate p-polarized light and s-polarized light, it needs to be an angle of less than 70°, particularly, 60° or less would be preferred for improving the efficiency.

Blue color light reflected by the dichroic mirror 18 is converted from linearly polarized light into circularly polarized light by the λ/4 plate 28. Circularly polarized blue color light is condensed by the lens 22 and is irradiated onto the phosphor wheel 20 with a spot diameter of 1 to 2 am.

The phosphor wheel 20 is formed from an aluminum flat plate and is formed with a plurality of regions, i.e., a region B that is an area of a diffuse reflecting surface (not shown), a region G that is coated with a phosphor substance for emitting green color light, and a region R that is coated with a phosphor substance for emitting red color light.

Light irradiated on the phosphor wheel 20 is converted at the respective regions into blue, green, and red color light, which in turn is emitted toward the lens 22. The color light turns again to parallel light by the lens 22, entering the λ/4 plate 28. By again passing through the λ/4 plate 28, blue color light is converted from circularly polarized light into p-polarized light, returning to the dichroic mirror 18. This enables blue color light again passing through the λ/4 plate 28 to pass through the dichroic mirror 18 together with green and red color light. As a result, blue, green, and red color light is emitted from the light source unit 110 in a time sharing manner.

Referring back to FIG. 3, the light emitted from the light source unit 110 enters a pair of fly-eye lenses composed of a plurality of lens elements. Luminous flux entering a first lens array plate 42 is split into a multiplicity of luminous fluxes. The multiplicity of split luminous fluxes converge on a second lens array plate 44. The lens elements of the first lens array plate 42 have an opening analogous in shape to the DMD 62 of the image generating unit 160. The lens elements of the second lens array plate 44 have a focal length which is defined such that the first lens array plate 42 and the DMD 62 have a substantially conjugate relationship. The light leaving the second lens array plate 44 enters a lens 46. The lens 46 is a lens for superimposing on the DMD 62 light leaving the lens elements of second lens array plate 44. The light from the lens 46 is reflected by a mirror 48 and thereafter passes through a lens 64 to enter a total reflection prism 66.

The total internal reflection prism 66 is composed of two prisms 68 and 70, with a thin air layer 72 being formed between surfaces of the two prisms. The air layer 72 totally reflects light incident at an angle not less than a critical angle. The light incident on the total reflection prism 66 via the lens 64 passes through a total reflection surface to enter the DMD 62. The DMD 62 deflects the micromirror so as to obtain light incident on a projection lens 82 and light advancing toward the outside of the effective range of the projection lens 82 according to a video signal. The light reflected by the DMD 62 enters the air layer 72 at an angle not less than the critical angle and hence reflects to enter the projection lens 82. In this manner, image light faulted by the DMD 62 is projected on a screen (not shown).

3. Use Case of Projection-Type Image Display Apparatus 3.1 Use Case 1

Referring to FIGS. 6 to 9, Use Cases of the projection-type image display apparatus 100 will be described.

Figure 6:
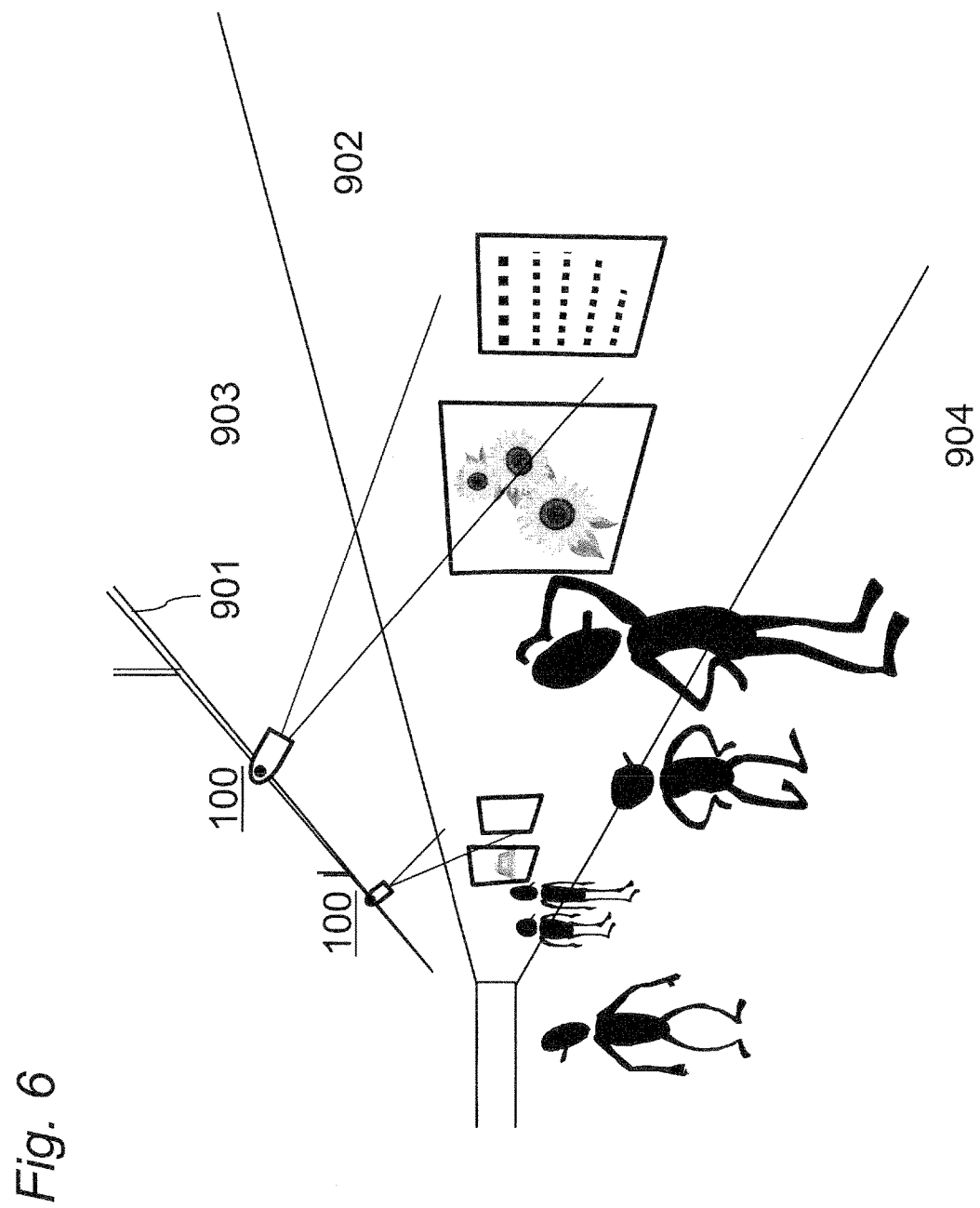
FIG. 6 is a schematic view explaining Use Case 1 of the projection-type image display apparatus.

In an example of FIG. 6, the projection-type image display apparatus 100 projects, on a wall surface 902 of an art gallery or a museum, information (text, image) explaining an exhibit and a spot of illumination light. A wiring duct 901 is disposed on a ceiling 903 of a projection space. A plurality of projection-type image display apparatuses 100 are connected onto the wiring duct 901. Each of the projection-type image display apparatuses 100 may be moved on the wiring duct 901 or may be fixed thereon.

The projection-type image display apparatus 100 can roll around a vertical axis and swing through 180 degrees around a horizontal axis (in this case, an axis parallel to the longitudinal direction of the wiring duct 901). By adjusting the rotation angles relative to the respective rotational axes, projection is enabled onto the wall surface 902 or a floor surface 904. The mounting position or the projection angle of the projection-type image display apparatus 100 can be manually adjusted by the user.

An external storage device (e.g., a USB memory) is connectable to the projection-type image display apparatus 100 so that the apparatus 100 reads and displays video data stored in the external storage device. Various video displays can be implemented by allowing the external storage device to store desired data and by connecting the external storage device to the projection-type image display apparatus 100. The luminance, the projection shape, and the projection distortion correction can be adjusted by an external control signal such as infrared rays from a remote controller.

The projection-type image display apparatus 100 may be connected, not only to the wiring duct 901, but also to a curtain rail. Alternatively, a dedicated rail may be disposed on the ceiling 903 without using an existing rail so that the projection-type image display apparatus 100 can be connected to the dedicated rail. A rail may be mounted on a wall surface so that the projection-type image display apparatus 100 can be disposed on the wall surface to project explanations onto the floor surface. This would be effective in the cases where there are no projection surfaces such as sculptures, nearby.

To control the projecting direction or the posture of the projection-type image display apparatus 100, a motor may be disposed at a connection to the wiring duct 901 so that the motor is driven by an external signal to control the mounting position or the projection angle. This can save user's time and labor required for mounting.

For update of displayed images, the wiring duct 901 may be utilized to connect the projection-type image display apparatus 100 and an external video generating device (e.g., PC) via a cable, thereby updating video data stored in the projection-type image display apparatus 100. Alternatively, the projection-type image display apparatus 100 may receive and display video data from the video generating device via the cable. The projection-type image display apparatus 100 may be provided with a radio receiving unit to receive external video data by radio to update the stored video data. A motion sensor may be disposed in a projection space to allow images to be displayed only when a person comes closer. This enables generation of an environment where the viewers can concentrate on viewing exhibits.

3.2 Use Case 2

Figure 7:
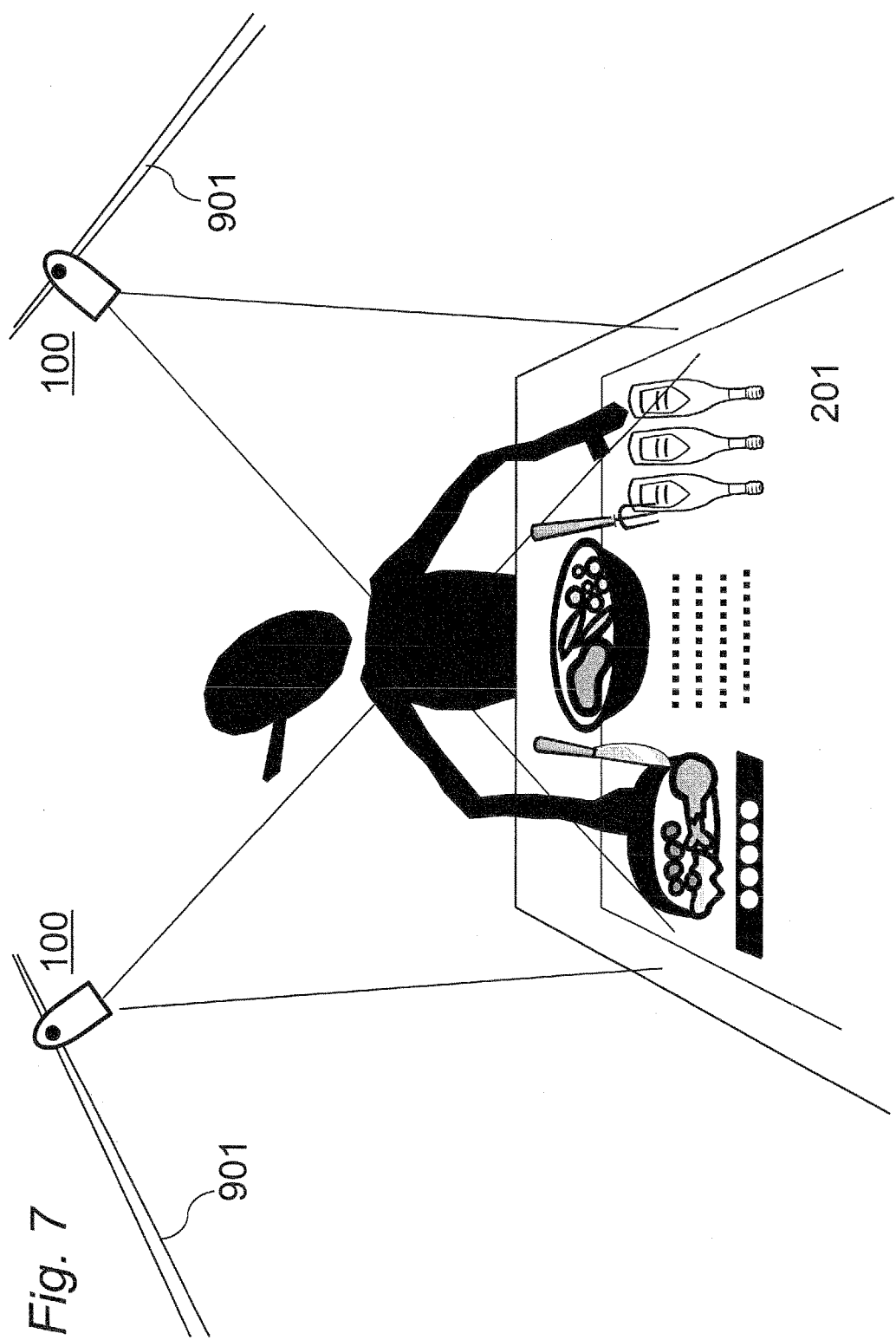
FIG. 7 is a schematic view explaining Use Case 2 of the projection-type image display apparatus.

FIG. 7 is a view explaining another Use Case of the projection-type image display apparatus 100.

In the example of FIG. 7, the projection-type image display apparatus 100 projects a menu onto a table surface 201 of each of tables in a restaurant. The projection-type image display apparatus 100 is placed on the wiring duct 801 disposed on the ceiling of a passageway space so that the projected light is less intercepted by a customer. A pressure sensor is disposed on the table surface 201 so that a finger's operation of the customer can be detected. The projection-type image display apparatus 100 and the pressure sensor for each table are connected to a system controller so that the projection-type image display apparatus 100 displays images received from the system controller. When detecting a customer's action to start display, the system controller sends a menu screen to the projection-type image display apparatus 100 for a target table, which in turn projects the menu screen onto the table surface. The customer operates the menu with a finger on the table surface 201 so that the customer can perform adjustment (rotation, scaling, etc.) of the display status, confirm the content, and place an order.

In response to the detected operation, the system controller modifies the displayed image and notifies a kitchen of an order. After dishes are served to the customer, image may be continuously displayed. Alternatively, a display mode may be switched to a illumination mode that irradiate illumination light without displaying images, thereby providing a space production ensuring relaxed dinner. Also in the illumination mode, the operation interface is displayed so that the customer can control the brightness, color, shape, etc.

Since, in performing a menu operation, the readability may be lowered by shading of fingers or arms during the operation, two projection-type image display apparatuses 100 may be arranged for one table. The customer's menu operation may be a gesture operation using a realistic three-dimensional sensor including a combination of a visible light detecting sensor and an infrared sensor, instead of the finger operation by the pressure sensor on the table surface 201.

Images may be three-dimensionally displayed, so that higher presence of the displayed object and greater amusement can be achieved. In this case, the system is composed of the two projection-type image display apparatuses 100, the controller (e.g., PC), and 3-D glasses. One of the two projection-type image display apparatuses 100 displays an image for left eye and the other displays an image for right eye. The controller controls the two projection-type image display apparatuses 100 to display alternately the respective video outputs from the projection-type image display apparatuses 100. The 3-D glasses are configured to allow an image for left eye to be visually recognized by viewer's left eye and an image for right eye to be visually recognized by viewer's right eye, by polarization of light or shutter drive. The customer can watch 3-D display by wearing the 3-D glasses.

3.3. Use Case 3

Figure 8:
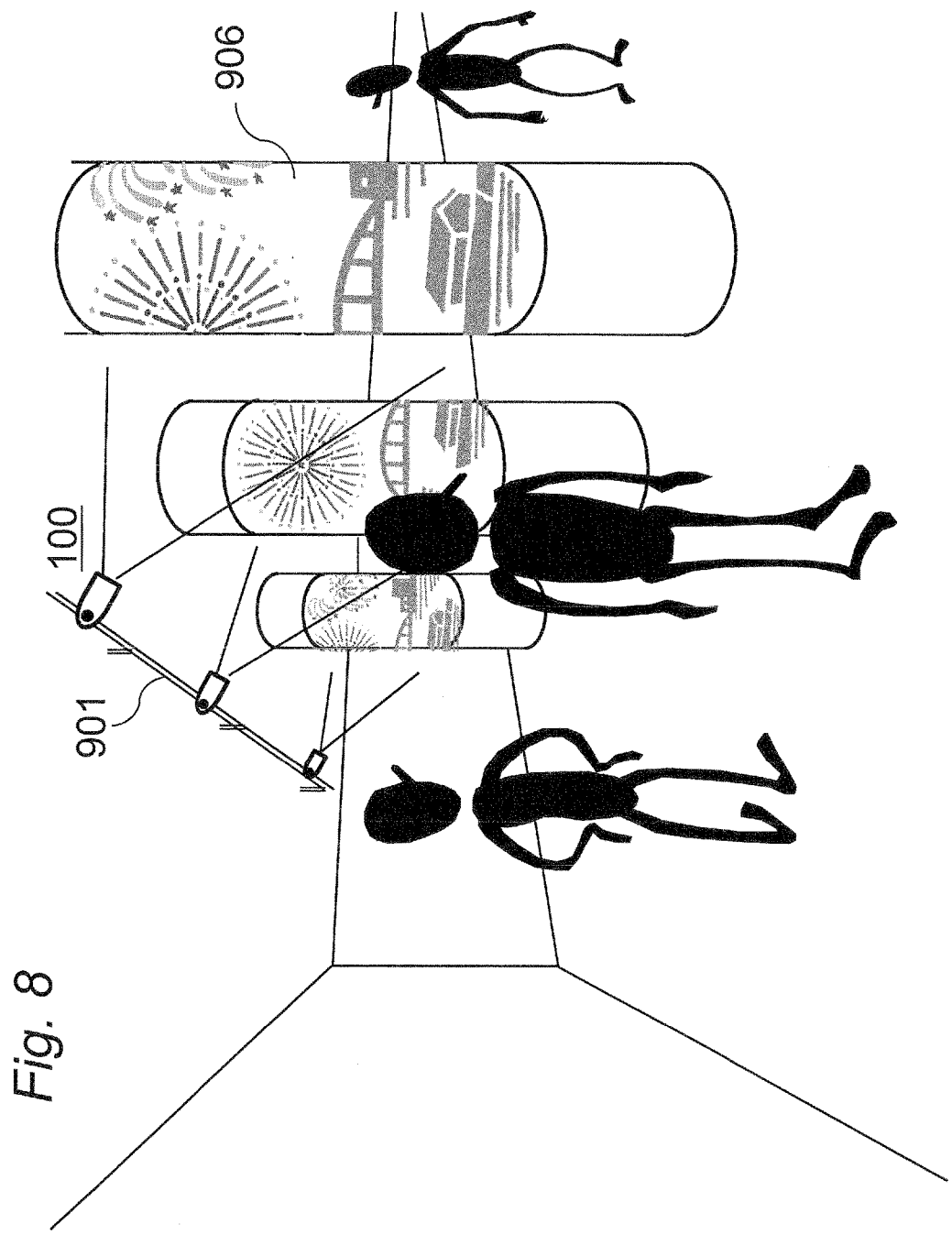
FIG. 8 is a schematic view explaining Use Case 3 of the projection-type image display apparatus.

FIG. 8 is a view explaining a further Use Case of the projection-type image display apparatus 100.

The projection-type image display apparatus 100 projects an advertisement onto a cylindrical projection surface 906. In the projection space, a plurality of projection-type image display apparatuses 100 are connected to the wiring duct 901 on the ceiling to project respective images onto different projection surfaces 906. A plurality of projected images work with one another to provide an extensive and stereoscopic display.

The plurality of projection-type image display apparatuses 100 are connected to a single system controller (not shown). The plurality of projection-type image display apparatuses 100 have the same video data in the respective internal storage units. The system controller sends display information (video synchronizing signal, video cutout position, display correction information) to the projection-type image display apparatuses 100, based on position information and projection surface information for the projection-type image display apparatuses 100.

Based on the received display information, the projection-type image display apparatuses 100 subject video data to an output timing adjustment, a video trimming, a keystone correction, and a distortion correction, to display the image onto the display surface. These corrections are applicable to any non-flat projection surfaces, not limited to the cylindrical projection surface. Therefore, the projection-type image display apparatuses 100 may project images onto a surface (e.g., a surface of a mannequin) of any object.

3.4. Use Case 4

Figure 9:
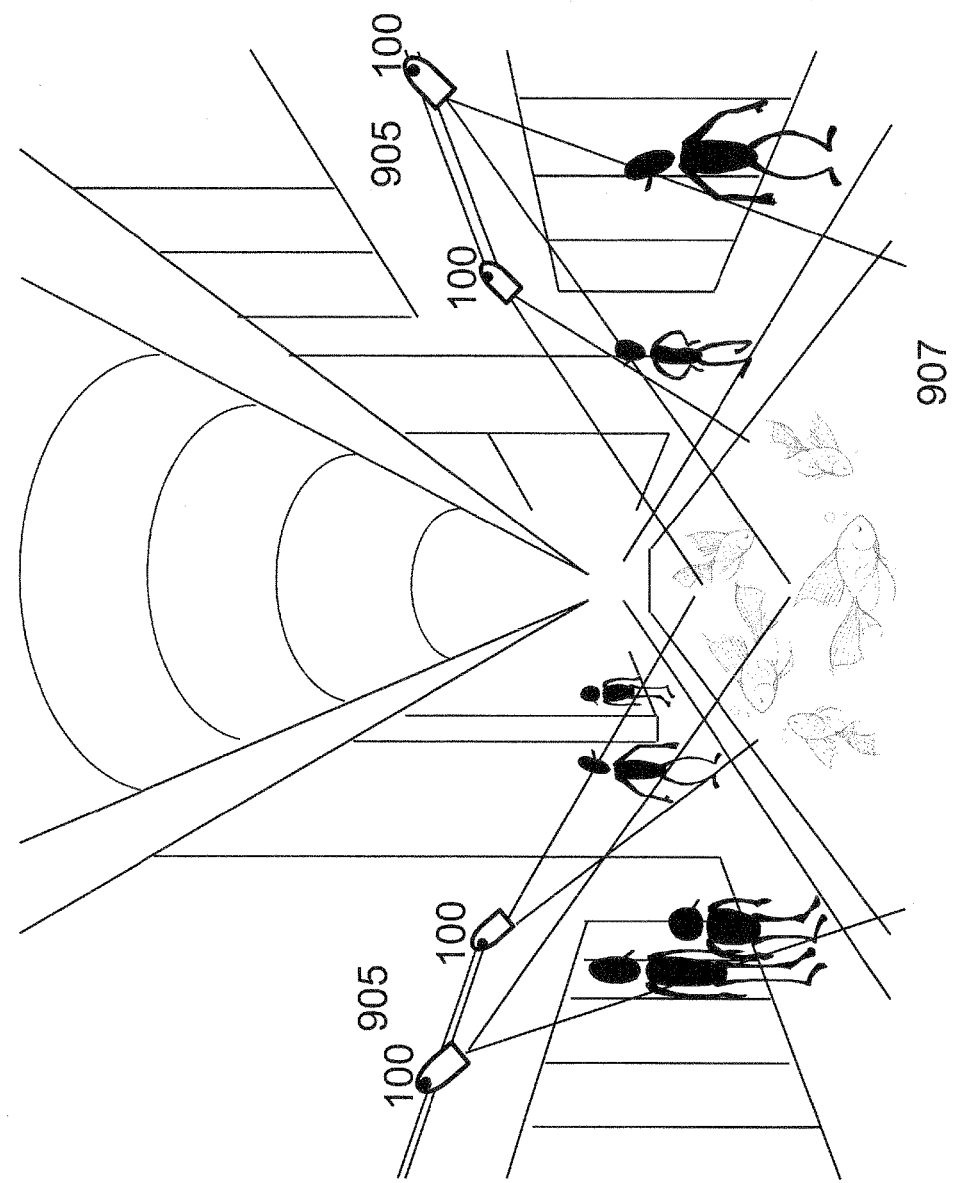
FIG. 9 is a schematic view explaining Use Case 4 of the projection-type image display apparatus.

FIG. 9 is a schematic view explaining a Use Case of the projection-type image display apparatus 100.

In the example of FIG. 9, the projection-type image display apparatus 100 is placed on a wall surface 905 to project images onto a floor surface 907. A projected image is an image blended by images projected from a plurality of projection-type image display apparatuses 100 and has a high resolution with a wide projection size.

The plurality of projection-type image display apparatuses 100 are placed at a height where image light is not intercepted by passers. At the time of installation, the projection-type image display apparatus 100 performs (1) calculation of a trapezoidal distortion correcting parameter, (2) adjustment of brightness and color between the projection-type image display apparatuses, and (3) adjustment of posture for blending projection. Processes of (1) to (3) are specifically carried out as follows.

(1) Each projection-type image display apparatus 100 projects a test image (e.g., cross-hatch image) for detecting a trapezoidal distortion. The user (adjuster) adjusts the distortion correcting parameter while viewing the projected test video.

(2) The projection-type image display apparatus 100 projects an entirely-white colored image. A spectral radiance meter is then used to acquire luminance and chromaticity of each image light. To eliminate differences among the projection-type image display apparatuses 100 from these values acquired, a parameter for adjusting RGB luminance balance and a parameter for adjusting a range of a video signal are acquired.

(3) The projection angle is manually adjusted so as to partially overlap with projected images, subjected to trapezoidal distortion correction, from the adjacent projection-type image display apparatuses 100.

The projection-type image display apparatuses 100 are connected to a single system controller (not shown) that controls all of the projection-type image display apparatuses 100. The system controller sends images to be projected to the projection-type image display apparatuses 100. The projection-type image display apparatuses 100 perform the trapezoidal distortion correction and the brightness/color correction to the received projection images and then project the images subject to the corrections.

The content of the image to be projected may be a single huge image obtained by blending images from all the projection-type image display apparatuses 100 or may be an image obtained by blending some of all the apparatuses. A camera system may be used to recognize the age and gender of passers so that the content may be changed according thereto. An image pursing motion of a passer may also be displayed. Illumination light as illumination may be irradiated on the wall surface or the floor surface, instead of images.

4. Control of Projection-Type Image Display Apparatus

The projection-type image display apparatus 100 of a first embodiment has a display mode that is set when used as a video projecting apparatus and an illumination mode that is set when used as an illumination apparatus. The display mode is a mode which projects image light that represents a moving picture or a still picture generated by the image generating unit 160 based on a video signal. The illumination mode is a mode which emits light from the light source unit 110, as illumination light, without modulating it by the image generating unit 160. In the illumination mode, illumination light to be emitted may be light that represents an image which is spatially uniform or substantially uniform and temporally unchanging, and is generated by the image generating unit 160. In this case, color, brightness, color temperature, etc., of illumination light can arbitrarily be changed. The image mode and the illumination mode differ from each other in functions and operation methods required. Accordingly, at the time of mode switching, the user interface or adjustment items in the projection-type image display apparatus 100 needs to be changed so as to ensure a smooth adjustment in each mode.

4.1 Configuration of Controller of Projection-Type Image Display Apparatus

Figure 10:
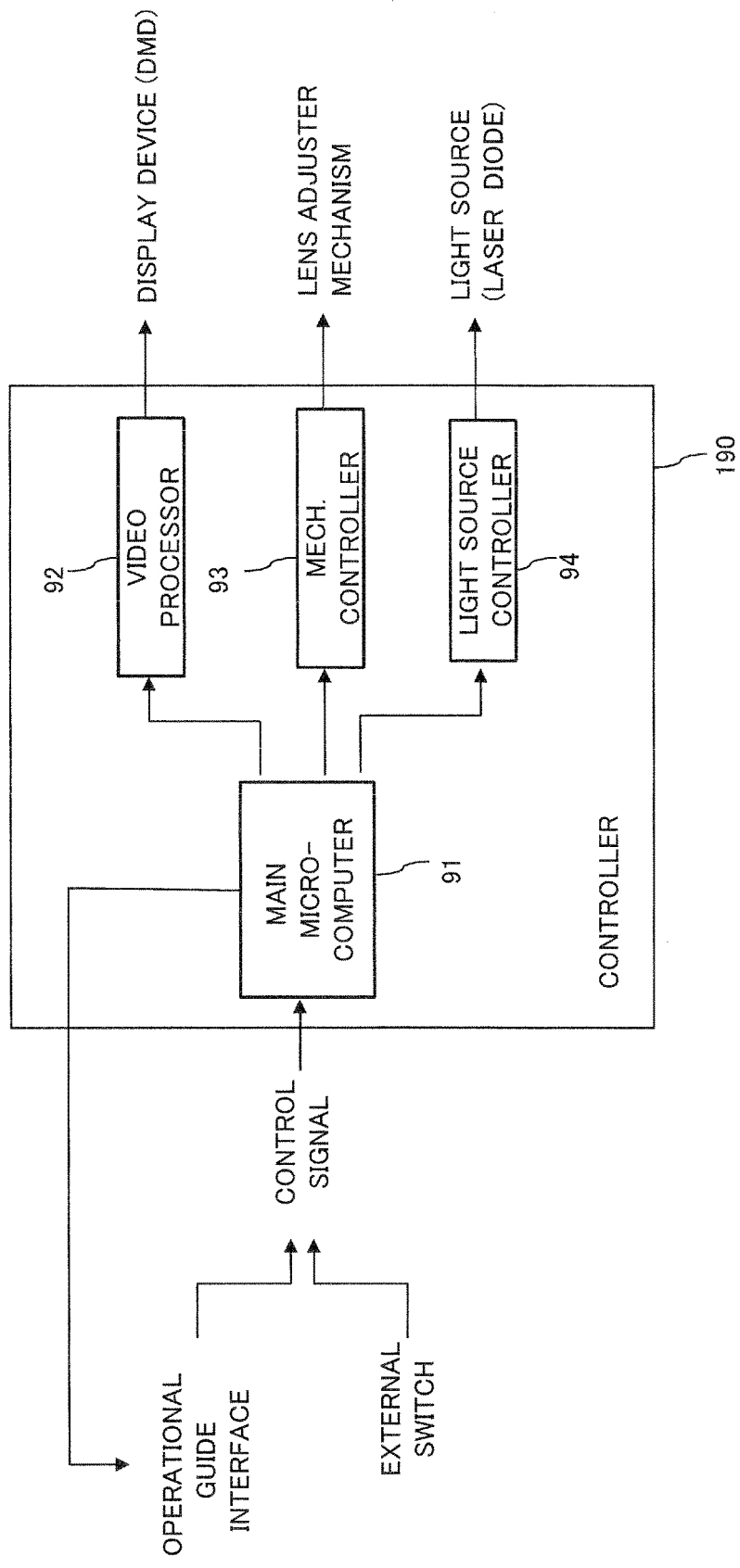
FIG. 10 is a view explaining the configuration of a controller of the projection-type image display apparatus.

FIG. 10 is a view explaining processing of the controller 190 of the projection-type image display apparatus 100. The controller 190 of the projection-type image display apparatus 100 includes a main microcomputer 91, a video processor 92, a mechanism controller 93, and a light source controller 94. The main microcomputer 91 receives user's operation on the user interface or a control signal from an external switch, to perform adjustments such as video RGB luminance balance and focus setting.

4.2 User Interface

Figure 11B:
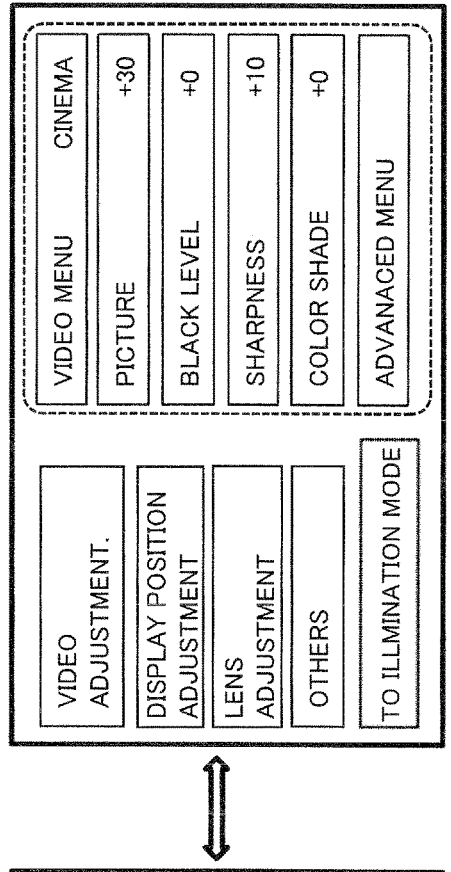
FIGS. 11A and 11B are schematic views exemplifying a user interface in illumination mode and display mode.
Figure 11A:
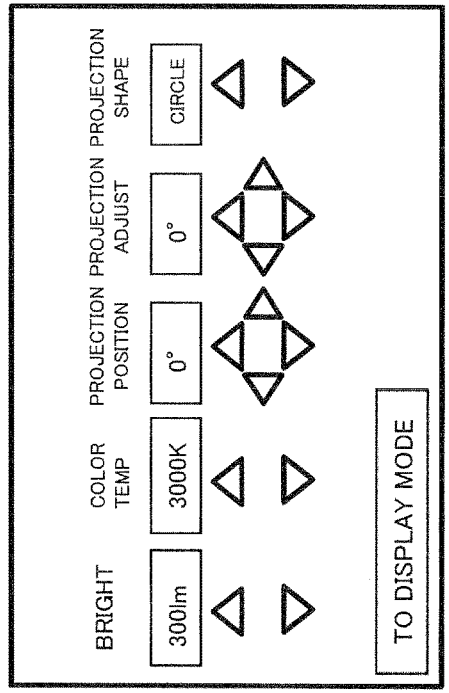

FIGS. 11A and 11B are views exemplifying user interfaces (U/Is) for the display mode and for the illumination mode in the projection-type image display apparatus 100. FIG. 11A shows an example of the user interface displayed during the illumination mode in the projection-type image display apparatus 100, while FIG. 11B shows an example of the user interface displayed during the display mode. In the illumination mode, as shown in FIG. 11A, a simpler and more intuitive adjustment guide is displayed as compared with the display mode. Specifically, in the user interface for the illumination mode, only basic items consisting of "brightness", "color temperature", "projection position", "projection adjustment", and "projection shape" required as the illumination apparatus are graphically displayed at the center on the screen so as to enable the operation without any expert technical knowledge of the projection-type image display apparatus 100.

As used herein, "projection position" refers to an adjustment of the digital shift amount after decision of the posture of the projection-type image display apparatus 100. "Projection adjustment" refers to a manual horizontal and vertical adjustment about trapezoid correction. "Projection shape" represents a selection of the shape of the illumination light. In the item of "projection shape", the user selects a shape from among square, rectangle, circle, and other complicated projection shapes formed by utilizing masking.

During the display mode, on the other hand, there are displayed items for picture quality adjustment similar to those of the ordinary projection-type image display apparatus. In this manner, during the illumination mode, a simpler user interface is provided than the display mode. That is, the number of the setting items displayed during the illumination mode is less than the number of the setting items displayed during the display mode. The number of user interface layers displayed during the illumination mode is also less than the number of layers at the time of the display mode.

Setting of each item is operated by a dedicated operation remote controller. When operating on a projection screen, it may be difficult if the projection screen is distorted. Thus, the items may be interlocked with an external controller (e.g., PC) or mobile device (e.g., smartphone). Specifically, a similar interface is operated, as an application for the smartphone, for sending the result of operation to a main body of the projection-type image display apparatus 100. At that time, the main body is provided with a radio signal receiving device. On the other hand, when the main body of the projection-type image display apparatus 100 is provided with an operation panel, settings made on the operational panel are also reflected on the functions. For example, an external switch or volume is disposed on the main body of the projection-type image display apparatus 100, and if the brightness is set, those settings are reflected.

Figure 12:
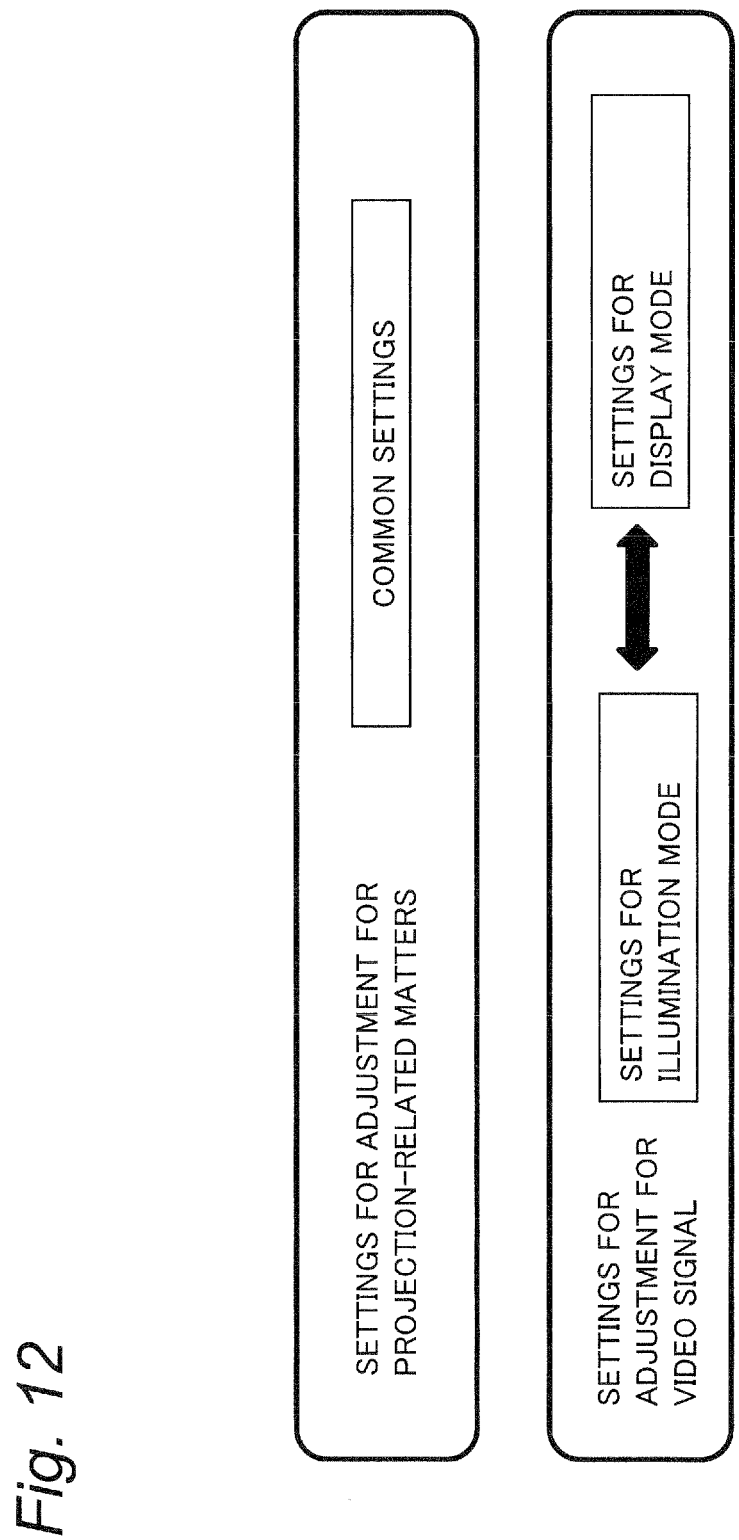
FIG. 12 is a view for explaining switching of setting items at the time of display mode switching.

FIG. 12 is a view explaining a switch of setting between modes. Settings about video signal adjustment such as brightness and RGB luminance balance are saved immediately before the mode switching in each mode. Then, upon the mode switching, the post-switching settings are returned to the mode which was set immediately before the mode switching. On the other hand, adjustments of projection-related matters such as projection angle/position are shared by each mode irrespective of mode switching.

Figures 13A, 13B:
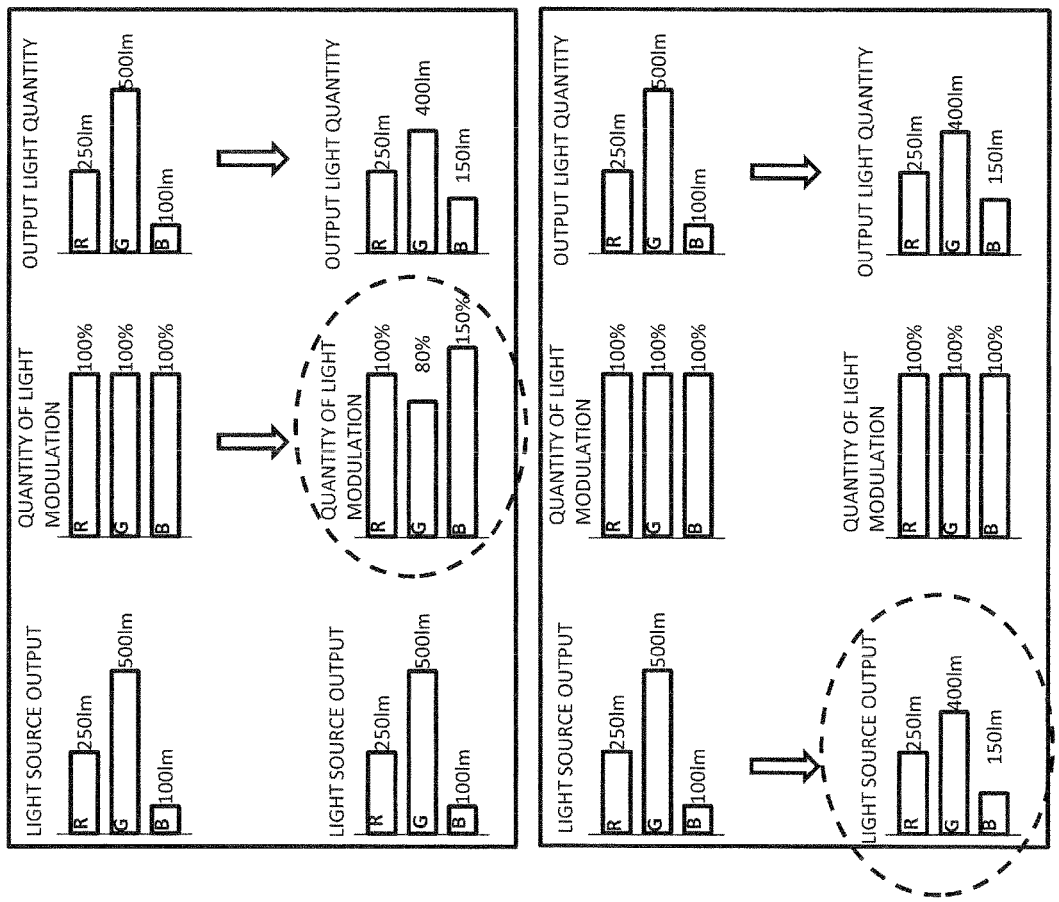
FIGS. 13A and 13B are explanatory views explaining an RGB luminance balance adjusting method in the projection-type image display apparatus.

FIGS. 13A and 13B are views explaining an adjustment method of the RGB luminance balance (color balance) upon mode switching. The RGB luminance balance, so-called color temperature, represents for example an RGB luminance ratio for expressing the entirely-white image.

The output of the RGB colors depends on the value of light output from the light source and on the quantity of light modulation effected by a display element. In the case of using a light source, such as a mercury lamp, incapable of rapid response or in the case of using single-color solid state light sources, control based on the quantity of light modulation would be preferred (see FIG. 13A). If otherwise plural-color solid state light sources can individually be controlled, it would be preferred to control the light source output (see FIG. 13B). For example, if it is desired to change the G-light output from 500 lm to 400 lm, the quantity of light modulation is controlled in the example of FIG. 13A and suppresses the value of a control signal sent to the display device to 80%. Since the output from the light source is unchanged, it is possible to change the output light quantity of G-light to 400 lm. Finely changing the light source output leads to an increase in cost and a reduction in reliability, and therefore it would be preferred to control the quantity of light modulation for the system which does not requiring fine half toning.

On the other hand, in the example of FIG. 13B, the value of current fed to the light source is suppressed to reduce the light source output from 500 lm to 400 lm. By making the quantity of light modulation unchanged at 100%, it is possible to change the output light quantity of G-light from the projection-type image display apparatus to 400 lm.

In the case of the system capable of controlling plural-color solid state light sources, for selection of control method, it may determine automatically whether the light source or the gain is selected to minimize the lowering in luminance when the color temperature changes.

4.3 Luminance Balance Adjustment

Figure 14:
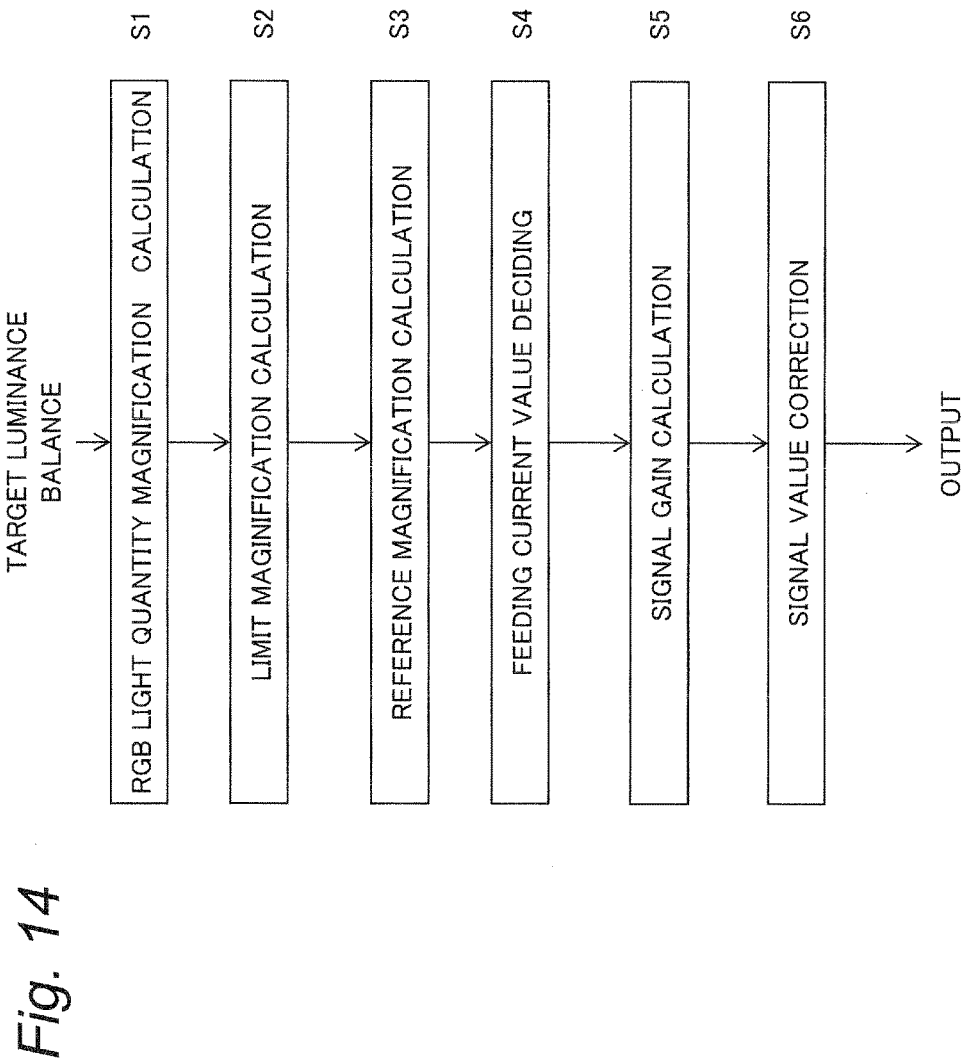
FIG. 14 is a flowchart explaining the luminance adjusting method in the projection-type image display apparatus.

FIG. 14 is a flow chart of a luminance balance adjustment method including a combination of a controlling of the light source output and a controlling of the light modulation quantity to minimize the lowering in luminance in the system capable of individually controlling plural-color light sources. First, at an RGB light quantity magnification calculation step (S1), change rate (light quantity magnification) of each of RGB colors is calculated by Equation (1) from target luminance balance which is set and present luminance balance.

$$L\_gain(R) = \frac{R\_target(R)}{R\_now(R)},$$
$$L\_gain(G) = \frac{R\_target(G)}{R\_now(G)},$$
$$L\_gain(B) = \frac{R\_target(B)}{R\_now(B)}$$
(1)

In the equation (1), L_gain( ) is the light quantity magnification, R_target( ) is the set target luminance balance, and R_now( ) is the present luminance balance.

Next, at a limit magnification calculation step (S2), limit light quantity magnification of each of RGB colors is calculated. The limit light quantity magnification is calculated by Equation (2) from the present feed current value and limit feed current value of each of RGB colors.

$$G\_limit(R) = \frac{L\_limit(R)}{L\_now(R)},$$
$$G\_limit(G) = \frac{L\_limit(G)}{L\_now(G)},$$
$$G\_limit(B) = \frac{L\_limit(B)}{L\_now(B)} \quad (2)$$

In the equation (2), G_limit( ) is the limit light quantity magnification, L_limit( ) is the limit feed current value, and L_Now( ) is the present feed current value.

At a reference magnification calculation step (S3), a reference magnification is a calculated, which is a minimum value among RGB light quantity magnifications calculated at step S1 and having light quantity magnifications not less than 1.0.

At a feeding current value deciding step (S4), the present current values of RGB colors is multiplied by the reference magnification decided at step S3 to decide values of currents to be fed for RGB colors by Equation (3).

$$In(R)=L\_now(R)\times Gain, In(G)=L\_now(G)\times Gain, In(B)=L\_now(B)\times Gain \quad (3)$$

In the equation (3), In( ) is the feeding current value and Gain is the reference magnification.

At a signal gain calculation step (S5), a gain of a signal value is calculated by Equation (4) so as to achieve the light quantity magnification for each of RGB colors.

$$S\_gain(R) = \frac{L\_gain(R)}{Gain},$$
$$S\_gain(G) = \frac{L\_gain(G)}{Gain},$$
$$S\_gain(B) = \frac{L\_gain(B)}{Gain} \quad (4)$$

In the equation (4), S_Gain( ) is the signal value gain which is multiplied on the subsequent signal value.

At a signal value correction step (S6), the original signal is multiplied by the signal value gain calculated at step S5, to obtain an output signal value. If the signal limit is exceeded at that time, the signal is clipped at its limit value. By controlling the light source output and the signal value gain in this manner, a desired luminance balance can be achieved.

4.4 Lens Position Control

Figure 15A:
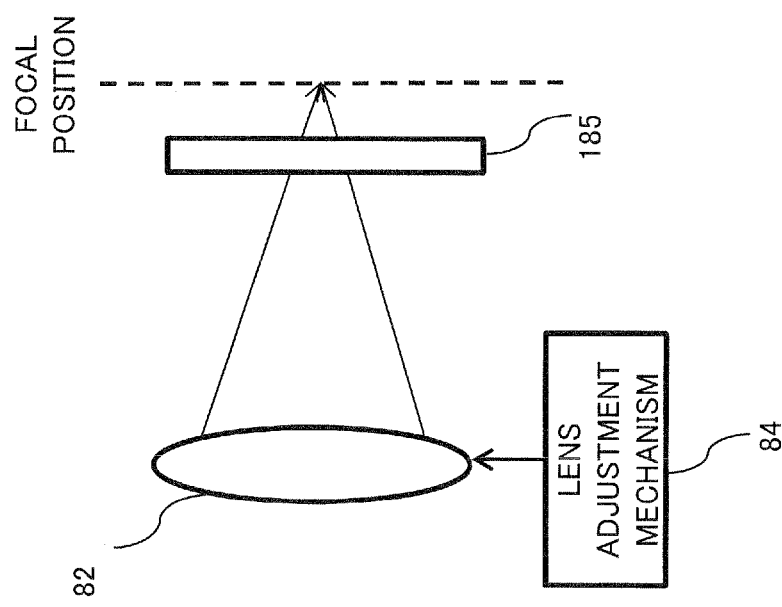
FIGS. 15A and 15B are views explaining lens adjustment in display modes in the projection-type image display apparatus.
Figure 15B:
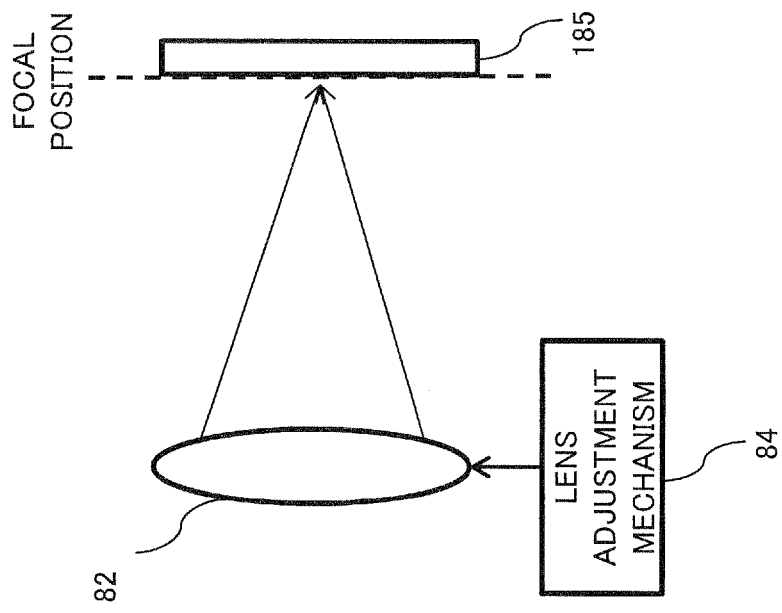

The projection-type image display apparatus 100 has a function of automatically switching the position of the lens of the projection optical system 180 in accordance with the display mode (display mode/illumination mode). FIGS. 15A and 15B are views each explaining the lens adjustment in each mode. FIG. 15A is a view explaining the lens adjustment for the illumination mode and FIG. 15B is a view explaining the lens adjustment for the display mode. The projection optical system 180 includes the projection lens 82 and a lens adjustment mechanism 84 for moving the projection lens 82 in the optical axis direction. When the display mode is selected, as shown in FIG. 15A, the lens adjustment mechanism 84 moves the position of the projection lens 82 to focus on a projection surface 185 to display a clear image on the projection surface 185.

On the other hand, when the illumination mode is selected, as shown in FIG. 15B, the lens adjustment mechanism 84 moves the position of the projection lens 82 to focus on a position offset from the projection surface 185. This realizes illumination based on soft light with less unevenness, similar to the ordinary illumination light. In this example, in particular, the focusing point is set posterior to the projection surface 185 when viewed from the projection lens 82. This can prevent focusing on an object, even through the object is present between the projection-type image display apparatus 100 and the projection surface 185. The focusing point may be positioned anterior to the projection surface 185 to realize soft light based illumination.

The projection-type image display apparatus 100 may store in advance, in a memory, information on distance showing preferred viewing distance, as information on assumptive position of the projection surface 185 for lens position adjustment. Alternatively, setting values designated by the user may be stored in the memory.

Alternatively, the projection-type image display apparatus 100 may incorporate an image pickup device and detect the focusing point of the lens of the projection optical system 180 by the contrast AF using the image pickup device. The projection-type image display apparatus 100 may perform the lens position adjustment as shown in FIGS. 15A and 15B based on the detected focusing point. Alternatively, the projection-type image display apparatus 100 may include a distance measuring sensor. The projection-type image display apparatus 100 may detect the distance to the projection surface with the distance measuring sensor, and determine the focusing point of the lens of the projection optical system 180 based on the measured distance to perform the lens position adjustment as shown in FIGS. 15A and 15B.

FIGS. 16A and 16B show coefficients of smoothing filters for video signals. These filters are applied to a video signal in the cases where a lens position adjustment mechanism (lens driving unit) is not provided in the projection optical system 180. Use of such a filter provides similar effects to those of the lens position adjustment effected by the lens driving unit. FIG. 16A shows a filter for the display mode and FIG. 16B shows a filter for the illumination mode. The filter for the illumination mode is an ordinary smoothing filter to eliminate high-frequency components from the displayed image. This achieves a uniform display like illumination light. On the other hand, the display mode does not apply the filter, resulting in a clear display with the frequency components held.

As described above, the projection-type image display apparatus 100 is provided with the light source unit 110, the image generating unit 160 that generates image light according to an input video signal, the light-guide optical system 140 that guides the light from the light source unit 110 to the image generating unit 160, the projection optical system 180 that projects the image light generated by the image generating unit 160, and the controller 190. The controller 190 controls the image generating unit 160, the light-guide optical system 140, and the projection optical system 180. The controller 190 has the display mode in which project image light is projected, and the illumination mode in which the light from the light source unit 110 is emitted as illumination light. During the display mode, the controller 190 controls the projection optical system 180 to focus illumination light from the projection optical system 180 on a projection surface. During the illumination mode, the controller 190 controls the projection optical system 180 to focus illumination light from the projection optical system 180 at a position different from the projection surface. This control provides illumination based on soft light with less unevenness similar to the ordinary illumination light.

As described above, upon switching between the display mode and the illumination mode, optimum setting in each mode is automatically switched, whereby operation items in each case can be reduced so that user's operability can be improved.

4.5 Display Correction

The above projection-type image display apparatus 100 can perform projection with various postures like the general illumination apparatus. As the projection postures, there can be adjusted three items, i.e., a shift along the wiring duct, and a roll and a swing around a vertical axis extending through a connection between the projection-type image display apparatus 100 and the wiring duct. Displacement by roll influences the projection distortion in the horizontal direction. Displacement by swing influences the projection distortion in the vertical direction, and influences projection being inverted upside down around in a vertical direction. In the case of the display mode, in particular, the projection distortion and the upside-down inversion cause breakdown of images, and hence there is a need for projection distortion correction for correcting them.

4.6. Angle Adjustment Guide

The projection-type image display apparatus 100 is provided with an angle adjusting guide. The angle adjusting guide will hereinafter be described with reference to the drawing. FIG. 17 is a view explaining an angle adjusting guide of the projection-type image display apparatus 100 for adjustment in a swing-direction.

The projection-type image display apparatus 100 is provided with an angle adjusting guide 501 in the vicinity of a hold portion of the first housing 101. The angle adjusting guide 501 is composed of a pointer 502 indicating a center line of the first housing 101, a pointer 503 indicating an angle of emitting the image light, and an angle indication plate 504. The pointer 502 indicating the center line of the first housing 101 and the pointer 503 indicating the angle of emitting image light are both fixed to the first housing 101 and move together with the first housing 101. That is, when the first housing is rotated in the vertical direction with respect to the support portion 103, the points 502 and 503 rotate along with the first housing 101.

The angle indication plate 504 is fixed to the support portion 103. The angle indication plate 504 has thereon scale from −90 degrees to +90 degrees with the vertical direction of 0 degree. In a range of 0 degree to 90 degrees, the displayed image is not inverted upside down, whereas in a range of minus 90 degrees to 0 degree, the display image is inverted upside down. The user can recognize the present posture in the swing direction from the angles, to the vertical direction, of the pointer 502 indicating the center line of the housing 101 and the angles, to the vertical direction, of the pointer 503 indicating the angle of emergence of the image light. By storing this posture in the memory, or the like, it becomes easy to reproduce the posture. When the lenses, etc. in the projection optical system 180 are changed and the optical path of the image light varies, the pointers 502 and 503 are moved for modification.

4.7 Upside-Down Inversion Correction in Video Display

Figure 18:
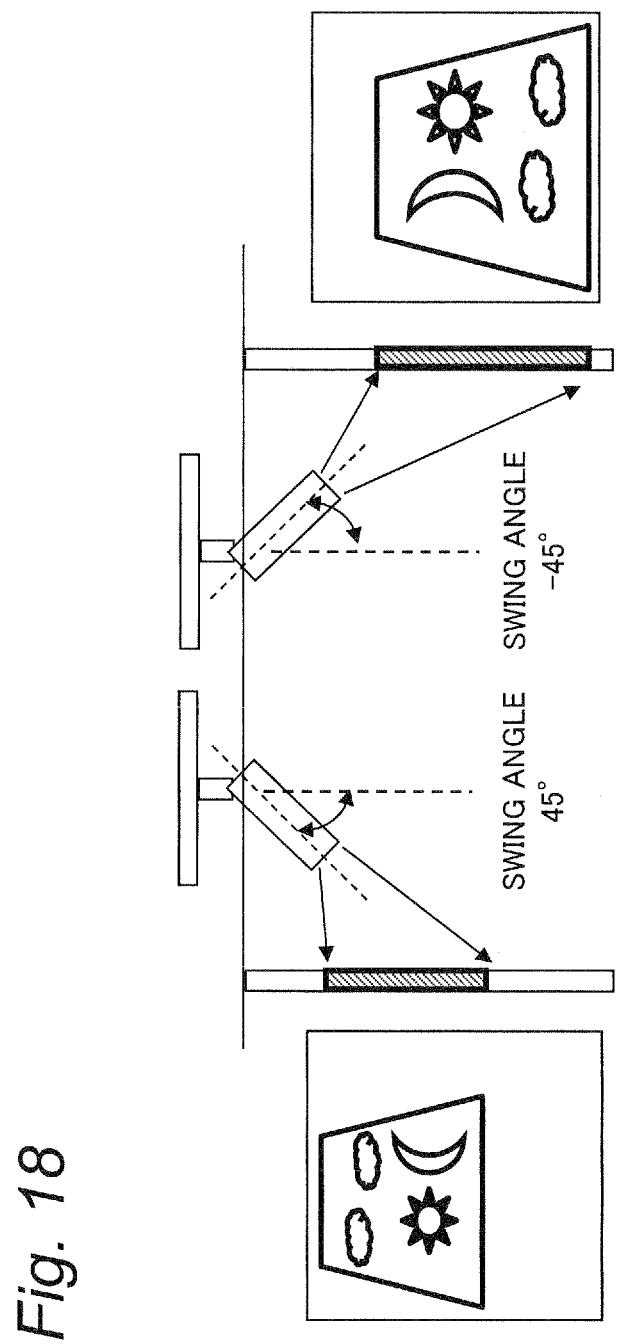
FIG. 18 is a view for explaining a change in a projected video depending on the swing angle of the projection-type image display apparatus.

The upside-down inversion correction in the projection-type image display apparatus 100 will be described below with reference to the drawing. FIG. 18 is an explanatory view explaining variations in the projection image due to the swing angle of the projection-type image display apparatus 100.

Since the projection-type image display apparatus 100 swings around the horizontal axis, the video display is inverted upside down with respect to the horizontal axis as the boundary. In order to correct this inversion to display a video without breakdown irrespective of the swing angle, the upside-down inversion correction is applied. The projection-type image display apparatus 100 receives a swing angle (angle of emitting of image light) input from the user and determines whether inverted projection is necessary. When the inverted projection is necessary, the projection-type image display apparatus 100 reads out video data from a frame memory storing the video data by reading line addresses reversely and sends the read video data to the DMD 62.

4.8 Projection Distortion Correction

An overall flow of projection distortion correction in the projection-type image display apparatus 100 will be described. The projection-type image display apparatus 100 corrects a projection distortion occurring depending on the roll angle and the swing angle and projects an image at the same position and with the same size for each absolute value of the swing angle.

Specifically, (1) the upside-down inversion correction is performed. Assume as a standard use case that the projection-type image display apparatus 100 is fitted to the wiring duct 901 extending along the ceiling and project an image onto a wall surface vertical to the floor surface. At that time, the projection is performed from vertical diagonal direction so that the projected image becomes distorted in the vertical direction. Further, distortion occurs in the horizontal direction due to roll. Thus (2) the trapezoidal distortion correction is performed. When the swing angle is inverted between positive and negative, the projection positions differ between the two cases due to an offset between the center of the housing and the angle of emitting image light, even if the distance to the projection surface is the same. Further the projection distance varies, and therefore projection size also becomes different. Hence, (3) Vertical shift/projection size is adjusted. Similarly, the brightness varies between the case where the swing angle is inverted between positive and negative and the case where it is not inverted between positive and negative, (4) the brightness is corrected.

Figure 19:
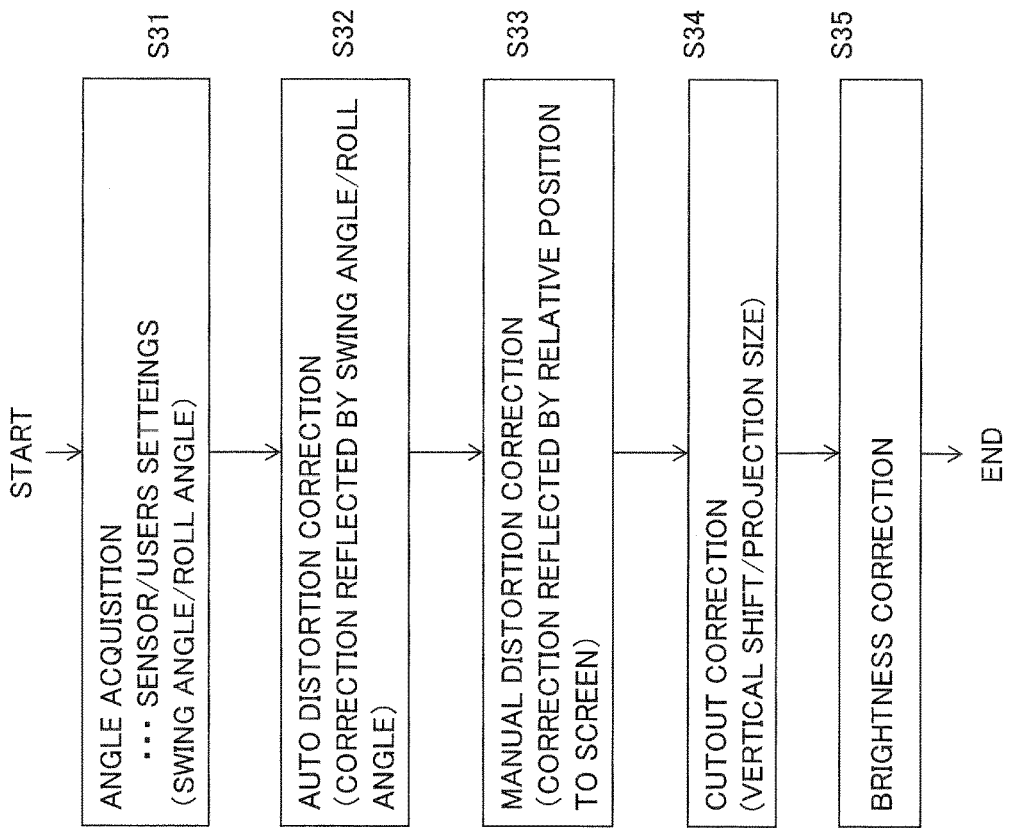
FIG. 19 is a flowchart explaining a process for correcting projection distortion in the projection-type image display apparatus.

These projection distortions are automatically adjusted through only the input of the swing angle and the roll angle. FIG. 19 is a view showing a processing flow of the projection distortion correction.

At an angle acquisition step (S31), the angle of emission of image light and the roll angle which are acquired from the angle adjusting guide 501 are set. At an auto distortion correction step (S32), the distortion correction is applied in condition that the projection surface is parallel to the wiring duct and is upright to the floor surface. At a manual distortion correction step (S33), a manual distortion correction is carried out by the user if the state of disposition of the projection surface is different from that of step S32.

At a cutout correction step (S34), the distance to the projection surface is set and the image cutout position after distortion correction is calculated. In the case of projection from the wiring duct, the size of image projected in the ordinary projection becomes smaller than the size of image projected in the upside-down inverted projection under the condition that the absolute values of the swing angle are equal. Thus, using, as the reference, the maximum size of cutout image in the ordinary projection, the cutout position in the case of the upside-down inverted projection is calculated such that the same projection position and the same size can be acquired.

At a brightness correction step (S35), the post-projection brightness ratio is calculated from the projection size ratio to control the value of current input to the light source. Specifically, the upside-down inverted projection has a larger projection size than that of the ordinary projection, and accordingly, the illuminance per unit area decreases. Thus, at the time of the ordinary projection, the value of current to the light source is reduced depending on the projection size ratio.

Figure 20:
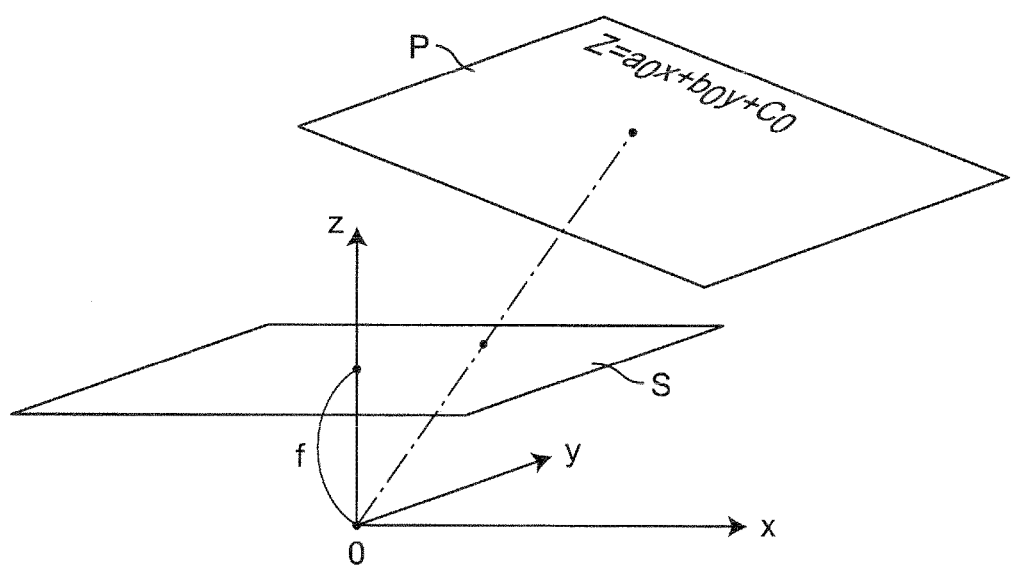
FIG. 20 is a view for explaining a correction method for distortion correction.

FIG. 20 is a view showing a correction method of the distortion correction. A image light plane S is a plane which has +Z direction (normal direction) in which the direction of travel of image light from the projection-type image display apparatus 100 advances. The projection surface plane P is represented by a coordinate system common to the image light plane S. The pixel position after distortion correction is calculated by Equation (5).

$$\begin{cases} x' = \dfrac{fx}{z} = \dfrac{f_x}{a_0 x + b_0 y + c_0} \\ y' = \dfrac{fy}{z} = \dfrac{fy}{a_0 x + b_0 y + c_0} \end{cases} \quad (5)$$

In the auto distortion correction at step S32, three coefficients of the projection surface plane P are fixed. On the other hand, in the manual distortion correction at step 33, three coefficients of the projection surface plane P are varied.

Although the angle is acquired manually by the user at step S31 in this control, it may be acquired automatically using an angle sensor. Although an example is shown where the projection position and the size are uniquely for each swing angle, the user may specify four corners of desired area in the projection screen so that the positioning and sizing are decided fitting to the desired area. At this time, in the case of the upside-down inverted projection, the top and bottom are inverted between the apparent specified position and the position on the internal video data. Thus, there is a need to invert the y-coordinate (ordinate) of the four points in the correction process.

Projection distortion correction may automatically be performed depending on the swing angle and the roll angle. This can reduce the user's burden of the projection adjustment.

Other Embodiments

The above embodiment has exemplified the case of having two operation modes, i.e., the illumination mode and the display mode, the number of the operation modes is not limited to two, but more fine modes may be set in each mode.

Although the above embodiment has exemplified the correction method of the projection position, the size, and the brightness as correction items based on the projection posture, the correction items are not limited thereto. Additionally, gamma correction, color correction, and so on, may be included in the correction. In the case of combining and using a plurality of projection-type image display apparatuses, individual differences between apparatuses may be corrected.

As set forth hereinabove, the embodiments considered as the best modes and other embodiments have been provided through the accompanying drawings and detailed description. These are provided for those skilled in the art to exemplify subject matters defined in the claims by referring to the specific embodiments. Accordingly, in the scope of patent claims and their equivalents, the above embodiments could be subjected to various changes, permutations, additions, omissions, etc.

INDUSTRIAL APPLICABILITY

The present disclosure is applicable to a projection-type image display apparatus such as a projector.

The invention claimed is:

1. A projection-type image display apparatus comprising:
a light source unit;
an image generating unit that generates image light according to an input video signal;
a light-guide optical system that guides the light from the light source unit to the image generating unit;
a projection optical system that projects the image light generated by the image generating unit; and
a controller that controls the image generating unit, the light-guide optical system, and the projection optical system, wherein
the controller has a display mode in which the image light is projected and an illumination mode in which the light from the light source unit is emitted as illumination light,
the controller controls the projection optical system
to focus illumination light from the projection optical system on a projection surface, in the display mode, and
to focus illumination light from the projection optical system at a position different from the projection screen, in the illumination mode, and
in the illumination mode, the controller controls the projection optical system to focus illumination light from the projection optical system at a position farther than the projection surface when viewed from the projection optical system.

* * * * *